United States Patent
Colaianni et al.

(10) Patent No.: US 10,228,682 B2
(45) Date of Patent: Mar. 12, 2019

(54) METHOD AND SYSTEM FOR MANUFACTURING APPAREL

(71) Applicant: adidas AG, Herzogenaurach (DE)

(72) Inventors: Matteo Colaianni, Herzogenaurach (DE); Jan Hill, Herzogenaurach (DE); Anna Wilhelmi, Herzogenaurach (DE); Jochen Björn Süßmuth, Herzogenaurach (DE); David Joseph Gareth O'Mahony, Herzogenaurach (DE); Christian Lott, Herzogenaurach (DE)

(73) Assignee: adidas AG, Herzogenaurach (DE)

( * ) Notice: Subject to any disclaimer, the term of this patent is extended or adjusted under 35 U.S.C. 154(b) by 0 days.

(21) Appl. No.: 15/611,618

(22) Filed: Jun. 1, 2017

(65) Prior Publication Data

US 2017/0351246 A1  Dec. 7, 2017

(30) Foreign Application Priority Data

Jun. 2, 2016  (DE) .................. 10 2016 209 675

(51) Int. Cl.
*A41H 3/00* (2006.01)
*G05B 19/4155* (2006.01)
*A41H 1/02* (2006.01)

(52) U.S. Cl.
CPC .......... *G05B 19/4155* (2013.01); *A41H 1/02* (2013.01); *A41H 3/007* (2013.01); *G05B 2219/49016* (2013.01)

(58) Field of Classification Search
CPC .................................. A41H 1/02; A41H 3/007
(Continued)

(56) References Cited

U.S. PATENT DOCUMENTS 5,768,135 A * 6/1998 Park ..................... A41H 1/10
                                                        700/130
6,157,868 A    12/2000 Abe
(Continued)

FOREIGN PATENT DOCUMENTS

EP          801905      10/1997
EP         2775456       9/2014
(Continued)

OTHER PUBLICATIONS

Counterpart German Patent Application No. 102016209675.3, First Office Action dated Feb. 7, 2017, 6 pages.
(Continued)

*Primary Examiner* — Nathan Durham
(74) *Attorney, Agent, or Firm* — Kilpatrick Townsend & Stockton LLP

(57) ABSTRACT

Methods and systems for manufacturing a piece or apparel. According to an aspect of the invention, a method for the manufacture of a piece of apparel comprises the steps of: (a) obtaining body data corresponding to at least one dimension of at least a part of the user's body, (b) obtaining pattern data corresponding to at least one pattern of the piece of apparel to be manufactured, (c) generating, based on the body data and the pattern data, manufacturing data adapted to be processed by a manufacturing machine, and (d) transmitting the manufacturing data to a manufacturing machine. When the manufacturing data is received at the manufacturing machine, the manufacturing data is processed and at least part of the piece of apparel is manufactured.

25 Claims, 9 Drawing Sheets

(58) Field of Classification Search
USPC .................................................. 700/130–133
See application file for complete search history.

(56) References Cited

U.S. PATENT DOCUMENTS

| | | | | |
|---|---|---|---|---|
| 2001/0026272 | A1* | 10/2001 | Feld | A41H 3/007 345/419 |
| 2003/0011590 | A1* | 1/2003 | Kung | G06T 17/00 345/419 |
| 2004/0153195 | A1* | 8/2004 | Watanabe | A41H 1/10 700/132 |
| 2005/0049741 | A1 | 3/2005 | Dias et al. | |
| 2005/0278058 | A1* | 12/2005 | Panebianco | A41H 43/00 700/131 |
| 2007/0250203 | A1* | 10/2007 | Yamamoto | G06T 19/00 700/132 |
| 2009/0222127 | A1* | 9/2009 | Lind | A41H 3/007 700/132 |
| 2014/0277663 | A1* | 9/2014 | Gupta | G06F 17/50 700/98 |
| 2015/0345068 | A1 | 12/2015 | Coffman et al. | |

FOREIGN PATENT DOCUMENTS

| | | |
|---|---|---|
| JP | 2001348718 | 12/2001 |
| JP | 2003301313 | 10/2003 |
| JP | 2004535519 | 11/2004 |
| JP | 2005188015 | 7/2005 |
| JP | 2005314847 | 11/2005 |
| JP | 2006512486 | 4/2006 |
| JP | 2009000533 | 1/2009 |
| JP | 2009030194 | 2/2009 |
| JP | 2015180987 | 10/2015 |
| WO | 0235952 | 5/2002 |

OTHER PUBLICATIONS

Counterpart European Patent Application No. 17173654.9, Extended European Search Report dated Oct. 2, 2017, 9 pages.
Mydesignlab , "Video "Mirror Mirror"", available online at https://vimeo.com/164654370 (website screenshot submitted), 2016, 2 pages.
Japanese Patent Application No. 2017-108868, Office Action dated Sep. 11, 2018, 8 pages (4 pages for the original document and 4 pages for the English translation).

* cited by examiner

METHOD AND SYSTEM FOR MANUFACTURING APPAREL

CROSS REFERENCE TO RELATED APPLICATION

This application is related to and claims priority benefits from German Patent Application No. DE 10 2016 209 675.3, filed on Jun. 2, 2016, entitled "Method and System for the Manufacture of a Piece of Apparel" ("the '675 application"). The '675 application is hereby incorporated herein in its entirety by this reference.

FIELD OF THE INVENTION

The present invention relates to methods and systems for manufacturing apparel.

BACKGROUND

Designing is one of the most important steps in manufacturing apparel. In a conventional linear process, the designing step is generally performed by the manufacturer of the apparel, in particular by its designer. That is, a designer may initially develop a set of detailed designs, including at least one pattern for the piece of apparel. Based thereon, instructions for the manufacture of a number of predefined sizes of the piece of apparel are generated by adapting the design to each size. However, such a conventional design process is restricted to the ideas and creations of the designers and a limited set of sizes. In other words, it is quite inflexible. Moreover, changing the initial design by a person different from the designer is virtually impossible.

In the digital age, one option to improve the design process is to use the shape of the body of a person wearing the piece of apparel. For example, applicant disclosed in EP 2 775 456 A2 a method for determining the body shape of a dressed person and a display that displays an avatar with at least one item of clothing. Another method disclosed in US 2005/0049741 A1 relates to making a pressure garment based on a 3D shape and pressure profile characteristics of a garment.

However, a disadvantage of these approaches for a designing process is that only a digital copy of the garments is provided and that the design cannot be further modified.

For example, the t-shirt design machine "Mirror Mirror" of the Korean company MyDesignlab (available at, https://vimeo.com/164654370) provides the possibility that a user may virtually design a t-shirt by using two remote controllers. Moreover, the user may draw samples with the two remote controllers or may select predefined samples.

However, such a t-shirt design machine is still too complex to operate for an ordinary user as usually at least one remote controller is needed. Further, the user would see a projection on the user of the image of the design. This does not provide for a high degree of interaction since the user still has to use remote controls to choose a design. The hands are used as in many other human-computer interfaces to select the design of the shirt, thereby providing a low interactivity for designing the t-shirt.

Further, all of these known tools propose to modify a design of a piece of apparel in a post-production process, such as with pens or screen printing machines, which provide a poor quality product.

There is hence a need in the field to at least reduce the disadvantages described above.

However, even if the above mentioned disadvantages are overcome, there is still the problem that the manufacturing methods and systems known in the art have long process cycle times or do not allow for the production of customized items of apparel. The benefits that may otherwise be obtained by improving on the above outlined disadvantages of the prior art with respect to the design process may be rendered useless.

It is therefore an object of the present invention to provide a more flexible method and system for manufacturing a piece of apparel to improve the physical or virtual design process of the apparel. It is a further object of the present invention to individualize the design and manufacturing process for a piece of apparel and to speed up the entire design and manufacturing process, together with producing high-quality products.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various embodiments of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

Certain embodiments of the present invention improve the process for designing and manufacturing wearable items, such as apparel, clothing, jumpers, shoes, shirts, and the like. Embodiments of the present invention enable a user to intuitively generate a pattern that is customized to the shape of the user's body. For example, a virtual space can be defined to include a virtual object and an avatar representing the user. The shape of the avatar may be defined in the shape of the user. The user may visualize the virtual object (e.g., using a display device) and control the avatar's movement based on the user's movement in the real world. When the avatar intersects with the virtual object in the virtual space, the intersection causes a pattern to be formed on the avatar. The resulting pattern may be customized to the shape of the user, and a wearable item may be manufactured with the customized pattern. Further, certain embodiments of the present invention enable the user to visualize and modify the customized pattern in real-time. For example, the pattern can be modified when the user moves in relation to the virtual object. This movement causes the original pattern formed by the intersection to change to a different pattern. Thus, the user can generate a customized pattern specific to the shape of the user's body by simply positioning himself or herself in relation to a virtual object.

As only a non-limiting example and for the purpose of illustration, the user may choose to design a pattern for a sweater. According to certain embodiments of the present invention, the user may enter an apparatus (described in greater detail below with respect to FIG. 1) to design a pattern for the sweater. The apparatus can include position detectors to detect a position and/or shape of the user. The apparatus may then generate a virtual space representing the physical space within the apparatus. The apparatus may also generate an avatar that represents a position and shape of the user. The virtual space can be visually presented to the user (e.g., on a display device or mirror) so that the user can view and control the avatar. The user can control movement of the avatar by physically moving around in the physical space within the apparatus.

Continuing with the above non-limiting example, the virtual space may include a virtual object defined in the shape of a three-dimensional (3D) soccer ball. For example, if the user chooses to place a pattern of the 3D soccer ball on a front, upper torso of the sweater, the user can control the avatar to move towards the virtual soccer ball so that the virtual soccer ball intersects with the chest of the avatar. When the avatar's chest intersects with the virtual soccer ball, the intersection causes a customized pattern to be formed (e.g., a circle contour or disk) in a manner that is specific to the shape of the user's chest. The pattern can be saved and stored as pattern data. As a benefit of the embodiments of the present application, the pattern created on the user's chest may be customized to the shape of the user's body, and modifying the pattern can be achieved in real-time when the user moves in the physical space.

According to certain embodiments of the present invention, a computer-implemented method for manufacturing a piece of apparel is provided. The method may include obtaining body data and pattern data. The body data may represent at least one dimension of at least a part of a user's body. The pattern data may represent at least one pattern to be applied to a piece of apparel. The method may further include generating, based on the body data and the pattern data, manufacturing data adapted to be processed by a manufacturing machine. In addition, the method may include transmitting the manufacturing data to the manufacturing machine. In some examples, when the manufacturing data is received at the manufacturing machine, the manufacturing data is processed and at least part of the piece of apparel is manufactured.

In some embodiments, generating the manufacturing data may include obtaining a set of sample data, and modifying the sample data based on the body data and the pattern data to obtain the manufacturing data.

In some embodiments, obtaining the body data may include detecting at least one spatial coordinate of a plurality of points on a surface of the user's body.

In some embodiments, obtaining the body data may include scanning at least a part of the user's body.

In some embodiments, the body data may include at least one body parameter that at least partly defines a body shape of the user's body.

In some embodiments, generating the manufacturing data may include adjusting the manufacturing data according to the body shape of the user.

Generating the manufacturing data may include adjusting the manufacturing data based on an expected shrinking of the piece of apparel during a first washing or a first steaming of the piece of apparel.

Obtaining the pattern data may include selecting an avatar for the user.

Modifying the pattern data may include modifying the at least one pattern of the piece of apparel.

In some embodiments, the method may further include manufacturing the piece of apparel based on the manufacturing data.

According to certain embodiments of the present invention, a system for manufacturing a piece of apparel may be provided. The system may include one or more data processors; and a non-transitory computer-readable storage medium containing instructions which, when executed on the one or more data processors, cause the one or more data processors to perform operations. The operations may include obtaining body data and pattern data. The body data may represent at least one dimension of at least a part of a user's body. The pattern data may represent at least one pattern to be applied to a piece of apparel. The operations may further include generating, based on the body data and the pattern data, manufacturing data adapted to be processed by a manufacturing machine. In addition, the operations may include transmitting the manufacturing data to the manufacturing machine. In some examples, when the manufacturing data is received at the manufacturing machine, the manufacturing data is processed and at least part of the piece of apparel is manufactured.

In some embodiments, the operation of generating the manufacturing data may include obtaining a set of sample data, and modifying the sample data based on the body data and the pattern data to obtain the manufacturing data.

In some embodiments, the operation of obtaining the body data may include detecting at least one spatial coordinate of a plurality of points on a surface of the user's body.

In some embodiments, the operation of obtaining the body data may include scanning at least a part of the user's body.

In some embodiments, the body data may include at least one body parameter that at least partly defines a body shape of the user's body.

In some embodiments, the operation of generating the manufacturing data may include adjusting the manufacturing data according to the body shape of the user.

The operation of generating the manufacturing data may include adjusting the manufacturing data based on an expected shrinking of the piece of apparel during a first washing or a first steaming of the piece of apparel.

The operation of obtaining the pattern data may include selecting an avatar for the user.

The operation of modifying the pattern data may include modifying the at least one pattern of the piece of apparel.

In some embodiments, the system may further include a manufacturing machine to manufacture the piece of apparel based on the manufacturing data.

The manufacturing machine may be a knitting machine.

In some embodiments, the system may further include a cutting unit adapted to cut the manufactured piece of apparel.

According to certain embodiments of the present invention, a system for generating customized patterns may be provided. The system may comprise: at least one position detector and a data processor. The position detector may be configured to generate body data. The body data may represent a shape of a user's body. The data processor may be configured to: generate a virtual space including at least one virtual object and an avatar, detect at least one intersection between the avatar and the at least one virtual object in the virtual space, and generate customized pattern data based on the at least one intersection. The shape of the avatar may be defined using the body data. The at least one intersection between the avatar and the at least one virtual object may cause a pattern to be formed on the avatar. The pattern may be used to generate the customized pattern data.

The system may also include a manufacturing machine configured to manufacture a wearable item using the pattern data and the body data.

The pattern may be formed on the avatar based on the shape of the user's body.

The data processor may be further configured to modify the pattern in real-time. Modifying the pattern may include detecting a new intersection between the avatar and the at least one virtual object. The new intersection may cause a new pattern to be formed on the avatar. The pattern may be modified using the new pattern.

In some embodiments, the system may also comprise a display device configured to display the avatar and the at least one virtual object.

The avatar may be controlled by movement of the user.

BRIEF DESCRIPTION OF THE DRAWINGS

In the following detailed description, embodiments of the invention are described referring to the following figures.

BRIEF DESCRIPTION

Figure 1:
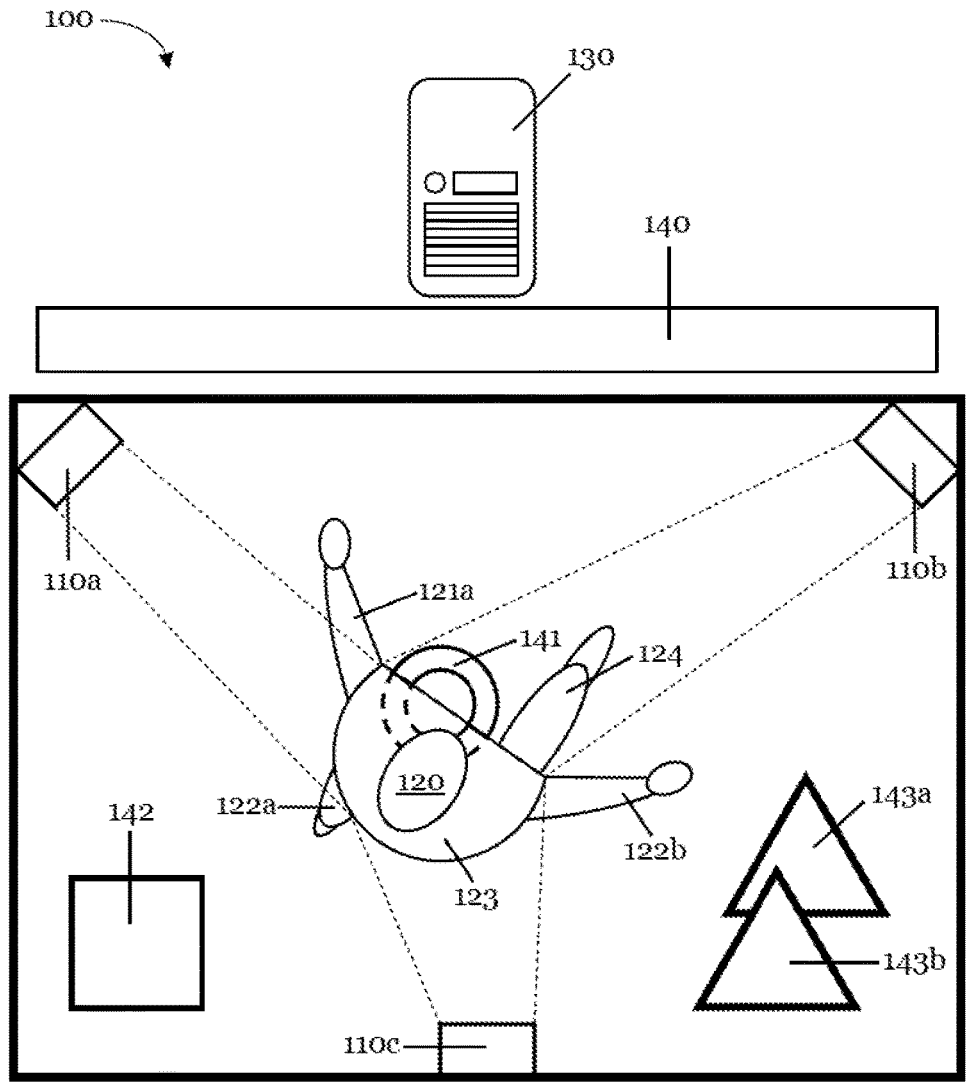
FIG. 1 illustrates a schematic top view of an apparatus for modifying pattern data for a piece of apparel prior to its manufacture, according to certain embodiments of the present invention.

The above mentioned problems and objectives are at least partly solved by methods and systems described herein.

According to certain embodiments, a method for the manufacture of a piece of apparel, comprises at least the steps of: (a) obtaining body data representative of at least one dimension of at least a part of the user's body, (b) obtaining pattern data representative of at least one pattern to be applied of the piece of apparel to be manufactured, (c) generating based on the body data and the pattern data manufacturing data adapted to be processed by a manufacturing machine, and (d) sending the manufacturing data to a manufacturing machine for processing and for manufacturing at least a part of the piece of apparel.

Hence, at least two sets of input data are used as inputs for the creation of the manufacturing data. For example, the at least two data sets may include data pertaining to the physique of the user (i.e., body data representative of at least one dimension of at least a part of the user's body), and also data pertaining to particular design preferences of the user, more precisely, pattern data regarding at least one pattern with which the piece of apparel shall be provided in the manufacture. Moreover, the term "generating" the manufacturing data may include creating and/or modifying the manufacturing data as will be explained in more detail below.

For example, a dimension of at least a part of the user's body may be a length (e.g., the length of a leg, arm, torso, etc.), a circumference (e.g., the circumference of the neck, chest, waist, etc.), a diameter (e.g. the diameter of the thigh, arm, etc.), and other suitable dimensions.

From these inputs, an individual set of manufacturing data can then be generated for each individual customer and sent to a manufacturing machine. The data may be sent via a wired connection, via wireless connection or using a storage medium like an USB-stick, a CD-ROM, an SD card or other devices known in the art.

In the following, some benefits and optional features of various embodiments of the present invention may be highlighted explicitly. However, emphasis is placed on the fact that further benefits and optional features of the present invention are also described in more detail below in relation to embodiments of an inventive system for the manufacture of a piece of apparel. The skilled person will understand that the benefits described there may also apply to corresponding embodiments of the inventive manufacturing method, and vice versa.

The step of generating the manufacturing data may comprise at least the steps of obtaining a set of sample data, and modifying the sample data based on the body data and the pattern data to obtain the manufacturing data.

The sample data can serve as a starting point for the manufacture of the piece of apparel, and the data may subsequently be modified and adjusted, as described in more detail below. The sample data may provide a "design blank" (which may be chosen from among a number of available blanks) and be created by the original designer of the brand. The design blank may, for example, comprise information, such as the external look and shape of the piece of apparel. The design blank may also comprise a provision for some technical area, such as, for example, breathable constructions in determined areas, non-customizable areas, and/or portions with more or less stretch built-in that the rest of the piece of apparel, etc. In some embodiments, the design blank may be subsequently modified and adjusted to a specific customer's needs. In this modification process, the body data of the user may be used to obtain a good fit of the apparel. Once the modification and adjustment of the data is complete, the manufacturing data may be generated which may, for example, control a manufacturing machine to create the piece of apparel with the specification profile (size, color, fit, pattern, etc.) as represented by the modified sample data. It is also possible that the sample data may not be modified and adjusted with the body data and pattern data. Thus, the sample data may be in the form of the manufacturing data, such that it may be used directly in a manufacturing machine, for example, a knitting machine. Additional examples of a manufacturing machine may include pressing machines, sewing machines, knitting equipment, cutting machines, 3D printing machines (e.g., a 3D printer that prints a 3D object using a material), finishing machines, and other suitable manufacturing machines.

The step of obtaining the body data may comprise gathering spatial coordinates of a plurality of points on the surface of the user's body. The step of obtaining body data may also comprise scanning at least a part of the user's body. Moreover, the body data can comprise body parameters, which at least partly define the body shape of the user. Thus, the manufactured piece of apparel provides a perfect fit to the current dimensions of the user's body or at least a part thereof. Further, in some embodiments, the manufacturing machine may be located near the location where the body of the user is scanned. For example, a body scan unit and a manufacturing machine (e.g. a knitting machine) connected thereto may be located in a store. In this way, the body of the user may be scanned and the obtained body data may immediately be processed together with pattern data to obtain manufacturing data, which is sent to the manufacturing machine. Thus, the user may buy a piece of apparel which is "made to measure" within a single visit of the store.

In some embodiments, the body data may also be retrieved from a memory or a database. The user may, for example, have used the inventive method before and decided to store his body data in the database to re-use it the next time and avoid renewing measurements.

The step of generating the manufacturing data may comprise adjusting the manufacturing data according to the body shape of the user. In particular, the step of generating the manufacturing data may comprise adjusting the manufacturing data representing a "design blank," as mentioned above, of the product with the body data of a user. Thus, the manufacturing data reflects the current body dimensions (physique) of the user and the piece of apparel to be manufactured provides for a perfect fit.

The body data obtained in one of these ways, or the body data obtained from a combination of these methods (i.e., body scan or by accessing a database), may be used to adapt the manufacturing data for the piece of apparel to the physique of the user in a precise manner. The coordinates of the plurality of points on the body surface can, for example, provide an "envelope" to the user's body at the corresponding part of his or her body, and this envelope can define a tightest acceptable fit for the piece of apparel. The scan may be 2D or 3D. A complete scan of the body or part of the body may be even more precise. Examples of body parameters that may be used in the present invention include the length of an arm or a leg, however, the present invention is not limited thereto.

In some embodiments, the step of generating the manufacturing data can comprise adjusting the manufacturing data based on the expected shrinking of the piece of apparel during the first washing and/or steaming of the piece of apparel. For example, the shrinking data may depend on many parameters, such as the type of textile used to make the piece of apparel, the size of the piece of apparel, or more particularly, the knitting structure used in the case of a knitted piece of apparel. The shrinking data may be used to adjust each row of a knit item individually. Therefore, the step of generating the manufacturing data may comprise adjusting the manufacturing data representing the design blank of the product with the shrinking data.

In this manner, the shrinking which may presumably occur during the first washing, steaming or tumble drying may be accounted for, such that after the first washing, steaming and/or drying the piece of apparel has the appropriate size to fit the user.

Further, the step of obtaining the pattern data may comprise selecting an avatar for the user. The avatar may be an avatar of the user based on the body data of the user. The avatar may also be a pre-stored avatar.

The avatar may be used to convey a realistic impression about the appearance of the finished piece of apparel by showing an image of the avatar wearing the piece of apparel according to the present stage in the process. This can help the user to decide whether further modifications to the data are necessary or desirable and he can receive real-time feedback about the effects of such further modifications.

The step of obtaining the pattern data may comprise obtaining the pattern data from a database.

Obtaining the pattern data from a database can speed up the method and make it easier to use for a customer. The database may, for example, comprise pre-defined sets of patterns that may be applied to the piece of apparel. Such sets of patterns may, for example, be pre-categorized according to the type of apparel currently selected by the user, or the like. At least one specific pattern may then either be chosen by the user, or a default pattern may be used, for example, depending on the kind of apparel.

In some embodiments, the inventive method may further comprise the step of modifying the pattern data and/or manufacturing data by the user. The step of modifying the pattern data can comprise modifying the at least one textile pattern of the piece of apparel by the user.

Modifying the pattern data and/or the manufacturing data may enable the user to adjust or modify, for example, a knitting pattern of the piece of apparel, the size, color, base material of the piece of apparel, and other aspects of the apparel. As a benefit of the present invention, the user may actively participate in the design process of the piece of apparel before its manufacture. The user may customize the pattern according to his or her needs and preferences, giving him or her a large degree of influence over the appearance of the piece of apparel.

The inventive method may further comprise the step of manufacturing the piece of apparel based on the manufacturing data. The manufacturing data can include instructions for a manufacturing machine. The inventive method may comprise controlling the manufacturing machine based on the manufacturing data.

In some embodiments, the piece of apparel is manufactured after all necessary modifications are complete.

In some embodiments, the piece of apparel may be manufactured after the user has agreed to the final set of data. For example, an avatar wearing the virtual counterpart of the piece of apparel to be manufactured may be presented to the user. The user may decide that he or she is satisfied with the piece of apparel. After final approval by the user, the piece of apparel may then be manufactured by the manufacturing machine, based on the manufacturing data for the piece of apparel.

In some embodiments, obtaining the manufacturing data with the instructions for the manufacturing machine from the body and pattern data created and/or modified by the user may be an automated process, so that no further interaction is required from the user or a technician in this regard.

The inventive method may also comprise the step of steaming the manufactured piece of apparel. It may also comprise the step of cutting the manufactured piece of apparel. The inventive method may further comprise the steps of washing and/or drying the manufactured piece of apparel.

These finishing processes may further improve the appearance, quality or longevity of the product, for example. In particular, the finishing processes may ensure that the shrinkage observed when first steam, wash, and/or drying operation occurs before the piece of apparel is delivered to the user, so that it is directly wearable by the user.

The manufacturing file generated by a method according to embodiments disclosed here may be used directly by a manufacturing machine, without intervention of a human. For example, certain embodiments of the method allow for generating at least one manufacturing instruction directly executable by a manufacturing machine with minimal intervention of a technician, and without modification of the manufacturing instructions by the technician.

As a non-limiting example, the manufacturing machine used in the inventive method may be a knitting machine.

Knitting is a technique that is very flexible with regard to the patterns and constructions that may be manufactured by an automated knitting machine. Further, the knitting technique is particularly well suited to be employed in the present invention. Other techniques known in the art may, however, also be used.

Therefore, in a method according to certain embodiments of the present invention, the adjustment or generation of a knitting manufacturing file with the body data may include at least the adjustment of the number of knitting loops on each knitting row. The adjustment allows for obtaining a customized fit for any user since the size of a loop is very small compared to any piece of apparel.

Additionally, in a method according to certain embodiments of the present invention, the adjustment or generation of a knitting manufacturing file with the pattern data may include at least the adjustment of a yarn feeding device that introduces the yarn to the knitting needles for each knitting loop or row to modify the yarn color or yarn type from one loop to another and/or from one row to another. The adjustment allows for obtaining a built-in pattern or design that is durable and of high quality, with the possibility to adjust the color of the pattern in many different manners, and/or to adjust the yarn type in order to obtain different functional zones. Moreover, the colors and color combinations may be made available depending on the availability of the materials for manufacturing the piece of apparel. The color choices available may be restricted by the material (in particular, yarn) color combinations available on the machines, for example, in a retail shop. The interaction between the user and a system performing a method according to certain embodiments of the present invention may occur in the retail shop, so that the piece of apparel may be manufactured in or next to the retail shop and may be delivered immediately or after a very short delay to the user. More particularly, if a knitting machine with a certain combination of yarns has a long list of orders, the color combination may be unavailable on the color selection screen present to the users during a given duration. Such duration may be calculated depending on the number and nature of items in the order list of the manufacturing machine. When one material color runs out (e.g. a yarn color) in a manufacturing machine or rather in the retail shop, this color may be unavailable for selection by the user on the selection screen (in particular, it does not appear on the screen). Providing the system performing a method according to certain embodiments of the present invention with the information that a material of a certain color is not available anymore may be manual or automatic.

According to a further aspect of the present invention, a system for the manufacture of a piece of apparel comprises (a) means for obtaining body data representative of at least one dimension of at least a part of the user's body, (b) means for obtaining pattern data representative of at least one pattern to be applied to the piece of apparel to be manufactured, (c) means for generating based on the body data and the pattern data manufacturing data adapted to be processed by a manufacturing machine, and (d) means for sending the manufacturing data to a manufacturing machine for processing and for manufacturing at least a part of the piece of apparel.

The present invention may provide for the first time highly efficient systems for the entire manufacturing process of a piece of apparel. By using the body data, important information about, for example, the lengths and sizes of portions of the piece of apparel, may be provided. By using the pattern data, influence may be exerted on the appearance of the piece of apparel.

At this point attention is drawn to the fact that numerous benefits and technical effects of embodiments of the inventive manufacturing method have already been discussed above and that these benefits and effects are also shared by the corresponding embodiments of the inventive system, as the skilled person will understand. Not all of the above explained effects and benefits will therefore be repeated again in the following disclosure.

In some embodiments, body data may be obtained using a body scan unit adapted to gather spatial coordinates of a plurality of points on the surface of the user's body. Further, body data may be used to determine a plurality of body parameters, which at least partly define the body shape of the user.

The body scan unit may generate two dimensional scans and/or three-dimensional scans of the user, for example, from the front or the back of the user, to determine the surface of user's body, and thus, to determine the body data and/or body parameters of the user. This information can allow the manufacture of a piece of apparel to be completely customized to the user's physique and also improve the manufacture in a large-scale customization process.

The inventive system may further comprise a fit correction unit adapted to adjust the manufacturing data according to the body shape of the user.

The skilled person will understand that the term "unit" as used herein does not have to be necessarily a physical unit, but may be a virtual unit (e.g. a software module, object, routine, etc.) in a computer-implemented process.

Such embodiments may take into account the style of the piece of apparel. For example, many pieces of apparel, such as t-shirts or pants, may have different fits (e.g., slim fit, loose fit, or regular fit). Therefore, the system may provide the possibility for preselecting a certain fit desired by the user before the piece of apparel is further manufactured. Thus, the manufacturing process may be more flexible.

The system may also comprise a shrink correction unit adapted to adjust the manufacturing data based on the expected shrinking of the piece of apparel during the first washing, drying, and/or steaming the piece of apparel.

As stated above, this may help to prevent the piece of apparel from changes its size after the first washing, drying, and/or steaming and ensure that the piece of apparel fits the user.

The inventive system can comprise a database storing avatar data. The avatar may be an avatar of the user based on the body data of the user. The avatar may also be a pre-stored avatar.

As mentioned above, such an avatar may be used to form an impression about the way the piece of apparel will look on the user after it has been manufactured and is donned by the user.

The inventive system may further comprise an apparatus for allowing the user to modify the pattern data and/or manufacturing data prior to manufacture.

The inventive system can also comprise a manufacturing machine adapted to manufacture the piece of apparel based on the manufacturing data. The manufacturing data can include instructions for the manufacturing machine. Moreover, the manufacturing machine may be a knitting machine. The inventive system can furthermore include a control unit adapted to control the manufacturing machine based on the manufacturing data.

As an example, the manufacturing data for the piece of apparel may comprise data that controls an automated knitting machine to manufacture the piece of apparel according to the possible customizations, modifications and adjustments described herein. Such embodiments may provide a solution for a system, which may be installed in a store so that the user may construct or modify the piece of apparel by himself or herself and/or with the help of a salesperson. Moreover, the user may obtain the manufactured piece of apparel immediately or in a short amount of time after the construction and manufacturing process.

The inventive system may comprise a steaming unit adapted to steam the manufactured piece of apparel. It may comprise a cutting unit adapted to cut the manufactured piece of apparel. It may also comprise a washing unit and/or a drying unit adapted to wash and/or dry the manufactured piece of apparel.

Certain embodiments of the present invention provide a customized piece of apparel with the highest quality in a fast manufacturing process. Using the steaming unit, excess fibers may be removed from the piece of apparel. Moreover, internal tensions and/or twists of the yarns after manufacturing, for example, after knitting, may thus be reduced or removed. In addition, steaming may set the shape of the piece of apparel before further processing steps are performed. Using the cutting unit, extra portions such as starter rows of carrier yarn to hold the pieces together may be trimmed away. Finally, the washing and drying unit may shrink the piece of apparel before the article is delivered to the user, as already mentioned above. Further, side effects of the manufacturing process, such as residuals of knitting needles oil may be removed. Alternatively or additionally, these steps may fluff up the piece of apparel to improve the hand feel and/or haptic aspects of the apparel to immediately provide the piece of apparel for the user.

According to certain embodiments of the present invention described above (and to be described in more detail below), the step of obtaining the pattern data may comprise using an apparatus, wherein the apparatus comprises (a) position detector adapted to detect a position of at least a portion of the body of the user, and (b) data processor adapted to compute at least one intersection of at least one virtual object and the portion of the body of the user, and pattern data representative of a pattern for the piece of apparel based on the intersection.

Alternatively, the step of obtaining the pattern data may comprise: (a.) detecting the position of at least a portion of the body of the user; (b.) computing at least one intersection of at least one virtual object and the portion of the body of the user, and (c.) computing pattern data representative of a pattern for the piece of apparel based on the intersection.

Likewise, the system according to certain embodiments may comprise an apparatus, wherein the apparatus comprises (a) position detector adapted to detect a position of at least a portion of the body of the user, and (b) data processor adapted to compute at least one intersection of at least one virtual object and the portion of the body of the user, and pattern data representative of a pattern for the piece of apparel based on the intersection.

Certain embodiments of obtaining pattern data enable the user to design the piece of apparel in a simple and intuitive manner. The user can simply design at least one pattern by moving his or her body or a part thereof relative to the at least one virtual object. The user defines the intersection of his or her body with the virtual object, which in turn defines the pattern for the wearable item. Therefore, the control of the apparatus according to the invention facilitates the creation of a pattern based on an intersection of a part of a user's body and a virtual object instead of complicated buttons and/or remote controls as known from the prior art. The user is enabled to interactively create the external appearance of the piece of apparel.

Moreover, in certain embodiments, the user may receive an immediate (or slightly delayed) feedback concerning the modifications made (e.g., by changing the position of the at least one portion of his body relative to the virtual object) as at least one projector can display the created and/or modified pattern for the a piece of apparel, on the contour of the body of the user. For example, two projectors, in particular three or four projectors, may ensure the projection of the pattern on different sides of the body of the user. Therefore, the user can better appreciate the pattern, which is based on the intersection of his body with the virtual object. Additionally, at least a mirror may be placed on at least one side of the interaction space for the user to conveniently see himself or herself and the projections on himself or herself.

Such an apparatus and/or method step of obtaining the pattern data may be used in various environments. For example, certain embodiments provide an apparatus and/or perform a method step within a typical cubicle of a department store. In some embodiments, only a support structure for the position detector and the data processor (e.g., a computer) is provided so that the operation of the apparatus may be followed by viewers and/or a salesperson or the like. In some embodiments, the apparatus may be adapted to interact with smartphones, mobile apps, social networks, the Internet and the like.

Further, the apparatus may be operated without having to use an additional device, such as a remote controller. Users with little or no experience may operate the apparatus with interactive technology.

"Body", "part of the body" and "portion of the body" in the context of the present invention may include the body itself of the user or a worn apparel on this body. It is also to be understood as the real body/worn apparel worn of the user, or of a virtual representation of the user's body/worn apparel. Thus, the data processor may be adapted to take into account whether the user engaged in the design process actually wears an apparel, or whether he or she does not wear an apparel during the design process. Accordingly, in the context of the present invention, computing at least one intersection of at least one virtual object and the portion of the body of the user may include computing an intersection of a virtual representation of the body of the user or a portion thereof and the virtual object. For example, based on the position of the portion of the body of the user, an avatar representing the user's body or a portion thereof may be computed. Subsequently, the intersection of the avatar or of a portion thereof and the virtual object may be computed. Thus, the intersection may be computed in physical space or in a virtual space as will be described in more detail below.

"Pattern" in the context of the present invention relates generally to any sort of pattern (e.g., a knitted, woven, embroidered or stitched pattern, and the like), design, graphic, drawing, picture, decoration, logo, understood as a single or a combination of shapes, lines, symbols, shadings, etc. with or without colors.

"Pattern data" in the context of the present invention relates to data representative of the pattern to be designed. For example, pattern data may refer to digital data that describes the pattern in the form of image data (e.g., a raster image or a vector image). Pattern data may also refer to instructions for a manufacturing machine, like for example knitting instructions for a knitting machine.

The virtual object may be defined in a virtual space and the data processor may be adapted to map the physical space to the virtual space and/or to map the virtual space to the physical space. Thus, the data processor may compute the intersection of the portion of the body of the user and the virtual object in either the virtual space or the physical space. "Physical space" in this context relates to the usual three-dimensional space in which humans usually perceive the world around them. "Virtual space" relates to the space in which the virtual object is defined. It may be a space of arbitrary dimension, but in some embodiments, is a three-dimensional space, so that the data processor may compute a one-to-one mapping between points in physical space and the virtual space.

According to certain embodiments of the present invention, the virtual object is "virtual" in the sense that it does not exist as a physical object in physical space, but that it is defined as an object in a virtual space. Due to the mapping between the physical space and the virtual space (or vice versa), it is possible to treat the virtual object as a physical object in physical space (or in some embodiments, to treat the portion of the body of the person as a virtual object in virtual space), and thus, to compute the intersection of the portion of the body of the user and the virtual object.

For example, the virtual object may be a sphere with a size comparable to a soccer ball and the user may position his chest, such that it intersects the sphere. In this case, the intersection of his upper body with the sphere has the shape of a spherical cap and the pattern based on such an intersection may have the shape of a circle (either a disk or just its contour with a given thickness) on the user's chest. It should be appreciated that more complex virtual objects and/or a plurality of virtual objects may lead to much more complex patterns. According to certain embodiments, the user may change the pattern simply by changing his position relative to the virtual object(s), so that the intersection changes accordingly. Thus, while the resulting pattern may be complex, the design process is simple and intuitive.

The processor may further be adapted to compute the intersection of the virtual object with a surface of the portion of the body of the user. Thus, the data processor may directly derive a two-dimensional pattern from the two-dimensional intersection on the surface of the portion of the body of the user. In the above example, the data processor could derive the intersection of the sphere with the surface of the user's chest. In some embodiments, the resulting pattern would have the shape of a circle (e.g., a disk or the circle's contour).

In some embodiments, the virtual object may be three-dimensional. Thus, the intersection with the part of the body of the user and the resulting pattern may be rather complex and result in interesting and aesthetically appealing patterns. For example, the virtual object may have the shape of a sphere, a cube, a pyramid, etc., but may also have more irregular shapes based on mathematical fractals or even on representations of existing objects (e.g., natural objects, sports equipment, famous athletes, stadiums and the like).

The data processor may further be adapted to compute the intersection based on an orientation, a change of orientation over time, a deformation in time, and/or a trajectory of the virtual object. Thus, the position, orientation and/or shape of the virtual object in the virtual space may not only be constant over time, but may change over time. For example, a sphere may "morph" into a cube. The user may then wait, without moving, until the pattern derived from the intersection of a portion of his body and the virtual object appears to be aesthetically appealing to him.

Additionally, the morphing and/or movement of the virtual object may be related to other factors. For example, the morphing and/or movement may be synchronized or may depend on other factors. Examples of such factors may include the movement of the user (the user's past movements), a specific movement with a determined portion of the user's body, the user's speed, the user's acceleration, the interaction of the user's body with the shapes (e.g., collisions under physics law), and other suitable factors. Other examples include music, live data, social media interactions, and so on.

The data processor may be adapted to create a snapshot of the pattern. For example, the user may indicate that he or she is satisfied with the resulting pattern and, as a result, the data processor may store the current pattern data in a database (or a storage medium) or transmit the current pattern data to a manufacturing machine. The pattern data representing the snapshot may then be used for manufacturing the piece of apparel, such as, for example, a jumper. The data processor may be adapted to receive the indication by the user or another person pressing a button, performing a predefined movement (e.g., a gesture or voice order) or based on a timer elapsing. A video of the interaction between the user and the virtual objects may also be recorded, so that an individual (e.g., the user) may replay the video at other places and moments, and select at least one appealing pattern.

The data processor may further be adapted to compute a plurality of intersections of a plurality of virtual objects and the portion of the body of the user, wherein the virtual objects comprise different locations in a virtual space. Thus, complex patterns may result from such an intersection. For example, the virtual objects may be multiple spheres at different locations, such that the resulting pattern may be a plurality of circles (e.g., a disk or the circle's contour), and the user may change the position of the dots by changing the position of the part of his or her body. Changing the position may be by a translation, a rotation or both.

The virtual objects may comprise different shapes. Thus, for example one virtual object may comprise a spherical shape, whereas another virtual object may comprise a cubical shape. In some embodiments, different regions of the virtual space may each contain a specific sort of shape distinct from the shape contained in another region of space. For example, a first region may contain shapes, such as cylindrical tubes, and another section may contain square cross-section tubes. The user would more easily select between one sort of graphic and another while still being able to obtain a very distinctive pattern from others if the density and sizes of the shapes are not homogenous in each of the regions of the virtual space. Different virtual objects with different shapes may result in a complex and visually more appealing pattern. It also helps to provide each user with a personal pattern distinctive from most of other patterns produced by other users.

Additionally, the virtual objects may comprise different sizes. For example, many spheres of different sizes may be simulated in the virtual space.

At least two virtual objects may intersect with each other. Thus, for example two intersecting spheres may result in a pattern of two intersecting circles. In this way, the pattern may become more interesting, complex and customized. Further, at least a first virtual object may be included in a second virtual object of a bigger size.

At least one color may be assigned to the virtual object and the processing unit may be adapted to compute the pattern data based on the color. Thus, the pattern may comprise different colors and the user may influence the distribution of color simply by changing the position of the part of his body.

The virtual object may comprise a plurality of layers. Moreover, at least two layers may comprise different colors. Furthermore, at least two layers may comprise different thicknesses. All of these embodiments follow the same idea of providing an improved designing process of the piece of apparel for the user.

The apparatus may comprise a memory. For example, the memory may store data representative of the virtual object. The memory may store data defining a position and/or an orientation of the virtual object. Moreover, the data may further define at least one real-time deformation for the at least one virtual object. In some embodiments, the data may define a spatial relationship between at least two virtual objects. In this way, the memory may be provided with data associated with virtual objects, which result in visually appealing patterns. The shapes, orientations, positions, and/or real-time transformations of the virtual object(s) may be provided by designers and stored in the memory. The user may interact with the virtual objects by changing the position of the part of his body so that different parts of the virtual objects intersect with the part of his body. In this way, the user may directly influence the appearance of the pattern resulting from the intersection, although doing so in the limits fixed by the designer's presetting or the virtual object(s).

The position detector may comprise an infrared (IR) projector and IR sensor. The IR radiation has the benefits of being comparatively easy to generate, safe for the user's body, for example, in contrast to X-rays, and invisible. Moreover, the source for such radiation may be simply provided with common diodes.

The position detector may be adapted to detect the position of different portions of the body of the user. For example, the position detector may be adapted to detect the position of the user's torso, arms and legs. Such detection may be based on image analysis by software. For example, as the user changes the position of his arms, but not of his torso and legs, he is able to change the pattern for his arms only, whereas, the pattern for the torso remains the same. In this way, more detailed adaptations of the pattern are possible.

Non-limiting examples of the piece of apparel may include a jumper, a t-shirt, trousers, pants, a jersey, a leotard, a sock, a shoe, in particular a shoe upper, and so on. Pieces of clothing that are flexible items can beneficially be designed and customized with the present invention, although their design usually is rather complex and does not allow for customization or individualization.

The apparatus may further comprise a display device adapted to display an image of the pattern to the user. Thus, the user may be provided with direct and immediate feedback about the pattern and how the final piece of apparel would look.

The apparatus may comprise a display device (e.g., a screen) adapted to display an image of the pattern to the user. The display device may comprise at least one visible light projector adapted to project the image of the pattern onto the body of the user. The display device may comprise more than one projector in order to project patterns on different portions of the user's body. The projectors may be synchronized in order to obtain a consistent representation of the item. Additionally, an apparatus according to certain embodiments of the present invention may comprise at least a data processor adapted to morph or transform the image of the pattern to the shape of the user to take into account that the user's body surface is not flat.

The display device may further comprise at least one mirror adapted for the user to see himself and projections of the pattern on his body. In some embodiments, the mirror may be equipped with a screen or display so as to overlay the images of the patterns to the reflected image of the user in the mirror. Thus, the user may directly see the resulting pattern on his body and he may change the pattern by moving his body or at least a part thereof. This provides for a very simple and effective design process, which nevertheless allows for the creation of very complex, customized by the user and visually appealing patterns.

The data processor may be adapted to render the pattern on an avatar. The avatar is a virtual representation of the user used to convey a realistic impression about the appearance of the finished piece of apparel by showing an image of the avatar wearing the piece of apparel. The shape of the avatar may correspond to the shape of the body of the user. The avatar may be created and/or modified based on the position of at least a portion of the body of the user. Thus, the avatar may "wear" a digital version of the item of clothing for which the pattern is to be designed. In this way, the user may get an impression of how the piece of apparel with the resulting pattern would look.

The avatar may also comprise at least one characteristic posture. As a non-limiting example, if the user is about to design a soccer jersey, the avatar may be shown during a shot. In another example, the user is about to design a running shirt and the avatar is shown running and wearing a running shirt comprising the current pattern.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Various embodiments of the present invention are described in the following detailed description. However, emphasis is placed on the fact that the present invention is not limited to these embodiments. The system and method described herein may be used for designing and manufacturing a piece of apparel in general, such as, for example, a jumper, a sweater, a pant, a short, a t-shirt, shoes, etc.

It is also to be noted that individual embodiments of the present invention are described in greater detail below. However, it will be appreciated by a person having ordinary skill in the art that the individual features described in relation to these specific embodiments may be further modified and combined with one another in a different manner within the scope of the present invention, and that individual steps or features can also be omitted. For example, the steps shown in FIGS. 2A-2F and FIGS. 3A and 3B may also be performed in a different order and the embodiments are in no way mutually exclusive, meaning that a certain feature or sub-combination of features of one of the shown embodiments may also be inserted to, replaced by or supplemented with a feature or sub-combination of features from different embodiments. In order to avoid redundancies, reference is made to the explanations in the previous sections, which also apply to the embodiments of the following detailed description.

FIG. 1 illustrates a schematic top view of an apparatus 100 for obtaining and/or modifying the pattern data for a piece of apparel, such as a jumper. The apparatus 100 comprises position detector 110 adapted to detect a position of at least a portion of a body of a user 120. In the example illustrated in FIG. 1, the position detector 110 comprises position detectors 110*a*, 110*b*, and 110*c*. Position detector 110*a* may be located in front of the user 120 to his left, position detector 110*b* may be located in front of the user 120 to his right, and position detector 110*c* may be located in the rear of the user 120. The number of position detectors may vary and position detector 110 may comprise any number of position detectors (e.g., one position detector may be sufficient).

The position detector 110 in the exemplary embodiments of FIG. 1 uses infrared (IR) radiation. As mentioned above, IR radiation may have the benefits of being comparatively easy to generate, safe for the user's body, for example, in contrast to X-rays, and invisible. Thus, the position detectors 110*a*, 110*b*, and 110*c* comprise an IR source (e.g., an IR emitting diode) and an IR detector (e.g., an IR sensitive diode). IR radiation is reflected by the user's body and based on the time of flight of the IR light, the position of the body of the user or of a part thereof is computed. In some embodiments, the IR detector may comprise an IR sensitive camera, which allows for determining the position of single parts of the user's body with high precision. In this case, it may be sufficient to use just a single position detector, possibly located right in front of the user.

The position detectors 110*a*, 110*b*, and 110*c* may be adapted to detect the position of the entire body of the user 120. This position may, for example, refer to the center of the user's torso 123 or to the center of the user's head. The position detectors 110*a*, 110*b*, and 110*c* may also be adapted to detect a position of a certain portion of the body of the user 120. For example, the position detectors 110*a*, 110*b*, and 110*c* may be adapted to detect the position of the left arm 121*a* and the right arm 121*b* of the user. The position detectors 110*a*, 110*b*, and 110*c* may further be adapted to detect the position of the torso 123. The position detectors 110*a*, 110*b*, and 110*c* may further be adapted to detect the position of the left leg 122*a* and the right leg 122*b* of the user. The position detector may be adapted to detect the position of a first portion of the body of the user 120 relative to the position of a second portion, distinct from the first portion, of the body of the user.

The position detectors 110*a*, 110*b*, and 110*c* may also be adapted to detect the position of the articulations or gestures of the user through the movement of the body portions and/or through direct measurement. For example, the distance between the two shoulders may be obtained. Thus, an avatar of the user may be constructed or a pre-selected avatar may be customized to the user's body characteristics. The position detectors 110*a*, 110*b*, and 110*c* may be adapted to create a virtual articulated skeleton representative of the main joints of the user's body (e.g. elbows, knees, shoulders, etc.).

"Body" 120 and "parts of the body" 121*a*, 121*b*, 122*a*, 122*b*, and 123 in the context of the present invention may include a worn apparel or not. Thus, the data processor 130 to be described below in more detail may be adapted to take into account whether the user engaged in the design process actually wears an apparel, or whether he does not wear an apparel during the design process.

Other techniques for detecting the position of at least a part of the body of the user 120 may be used in the present invention individually or in combination, such as cameras coupled to image analysis, ultrasonic sound, a mat with electric contacts, capacitive sensors, a radar, and the like. For example, the IR projector and sensor described above may be coupled to at least one camera.

The apparatus 100 also comprises data processor 130 adapted to compute at least one intersection of at least one virtual object 141, 142, 143*a*, and 143*b* and a portion of the body 121*a*, 121*b*, 122*a*, 122*b*, and 123 of the user, and pattern data representative of a pattern for the piece of apparel based on the intersection.

In the example of FIG. 1, four virtual objects are shown. The virtual object 141 is a sphere, which is shown as a circle due to the simplified two-dimensional illustration of FIG. 1. The virtual object 142 is a cube, which is shown as a square due to the simplified two-dimensional illustration of FIG. 1. The virtual objects 143*a* and 143*b* are two overlapping (i.e., intersecting) pyramids that are shown as triangles due to the simplified two-dimensional illustration of FIG. 1. It should be appreciated that more complex virtual objects and/or a plurality of virtual objects (e.g., overlapping or intersecting virtual objects) may lead to much more complex patterns. Using certain embodiments of the present invention, the user may change the pattern simply by changing his position relative to the virtual object(s), so that the intersection changes accordingly. Thus, while the resulting pattern may be complex, the design process is simple and intuitive.

As schematically shown in FIG. 1, each of the virtual objects 141, 142, 143*a*, and 143*b* is provided with a different shape and a different position, however, the present invention is not limited to the illustrated shapes and positions. In some embodiments, virtual objects may be of any type, for example, dots in space, a 'one'-dimensional or two-dimensional curve in space, an open or a closed surface in space, or a volume in space.

The virtual objects 141, 142, 143*a*, and 143*b* are defined in a virtual space. For example, the data processor 130 stores object data representative of the characteristics of the virtual objects, such as shape, color, position in such a virtual space, and in some cases, evolution of shape and/or color and/or position in time. In some embodiments, for the sphere 141, the data processor 130 could store the position of its center and its diameter. For the cube 142, the data processor 130 could store its center, the position of the center and the length of its edges. In some embodiments, it is also possible that the data describing the virtual objects is stored in another format, for example, as a collection of points in three-dimensional space, connected by various geometric entities, such as triangles, lines, curved surfaces, etc. The coordinates of the virtual objects 141, 142, 143*a*, and 143*b* may be defined relative to some reference point of the apparatus 100, in particular a reference point correlated to the interaction space for the user, such that it is possible to compute the physical relation (e.g., distance, orientation, intersection etc.) of the virtual object to the body of the user 120 as will be described in more detail below.

The data processor 130 may be adapted to map the physical space to the virtual space and/or to map the virtual space to the physical space. Thus, the data processor 130 may compute the intersection of the portion of the body of the user 120 and at least one of the virtual objects 141, 142, 143*a*, and 143*b* in either the virtual space or the physical space. "Physical space" in this context relates to the usual three-dimensional space in which humans usually perceive the world around them. "Virtual space" relates to the space in which the virtual objects 141, 142, 143*a*, and 143*b* are defined. It may be a space of arbitrary dimension, but in some embodiments, is a three-dimensional space, so that the data processor 130 may compute a one-to-one mapping between points in physical space and the virtual space.

According to certain embodiments of the present invention, the virtual objects 141, 142, 143*a*, and 143*b* are "virtual" in the sense that they do not exist as a physical object in physical space, but that they are defined as objects in a virtual space. Due to the mapping between the physical space and the virtual space (or vice versa), it is possible to treat the virtual objects 141, 142, 143a, and 143b as physical objects in physical space (or in some embodiments, to treat the portions 121a, 121b, 122a, 122b, and 123 of the body of the user 120 as a virtual object in virtual space), and thus, to compute the intersection of the portions 121a, 121b, 122a, 122b, and 123 of the body of the user 120 and the virtual objects 141, 142, 143a, and 143b.

Due to the relation between the physical space and the virtual space in which the virtual objects 141, 142, 143a, and 143b are defined, it is possible to obtain a physical relation between the body of the user 120 or parts thereof (like the arms 121a, 121b, legs 122a, 122b or torso 123). For example, it is possible to determine the distance between the body (or parts thereof) and at least one of the virtual objects 141, 142, 143a, and 143b, or to determine whether the body (or parts thereof) intersects at least one of the virtual objects 141, 142, 143a, and 143b, and how this intersection looks like. In this sense, the virtual objects become "real" or at least "visible" objects as the user may interact with them during the pattern design process described herein.

Thus, as exemplarily shown in FIG. 1, the sphere 141 intersects with the upper torso 123 (e.g., the chest). For example, the intersection has the shape of a spherical cap and the two-dimensional pattern extracted for the design of, for example, a jumper based on such an intersection has the shape of a circle. Hence, the pattern data correspond to a circle. If the pattern data were instructions for a knitting machine, the knitting machine would knit a jumper (in the example of FIG. 1) with a circle on the chest. The pattern could be distinguished from the surrounding areas of the jumper by its color, the knitting pattern, the yarn used, etc.

As an illustrative example, if the user 120 would move from the sphere 141 to the cube 142, i.e., take a step back, the resulting pattern would change because the intersection of the cube 142 with his body 120 (or a part thereof) would be different as compared to the sphere 141. The intersection resulting from the cube 142 would have the shape of a square, rectangle or triangle depending on the orientation of the user's body (or a part thereof) relative to the cube 142. It should be noted that any curvature on the user's body may lead to more complex intersections and corresponding patterns. Additionally, if the body of the user is so positioned that the cube crosses over from one side of his body to the other side of his body, a pattern may be created both on the back of the jumper and on the front of the jumper, back and front patterns being potentially different.

Similarly, if the user 120 would move to the two intersecting triangles 143a and 143b, the resulting pattern would be similar to two intersecting triangles, again depending on the orientation of the user's body (or a part thereof) relative to the triangles 143a and 143b.

It is also possible that the virtual objects 141, 142, 143a, and 143b change or transform over time. For example, the virtual objects may follow a certain trajectory, change their orientation, change their color, change their size and/or deform. As a non-limiting example, the sphere 141 could "morph" into a cube, similar to the cube 142, and back again to a sphere. This could take place within a few seconds, minutes, hours, or any time period as the present invention is not limited thereto.

The virtual objects 141, 142, 143a, and 143b may also comprise a plurality of layers which differ for example by color. Thus, the intersection with the body of the user 120 would lead to a multi-color pattern. The layers may have different thicknesses, as well. The layers may also differ by the knitting structure they represent, and/or by color, and/or by yarn types.

The data processor 130 may be a computer, such as a desktop computer, laptop, notebook, server computer, embedded computer or the like. It may also be a mobile device, such as a smartphone, tablet computer, etc. The data processor 130 may also be located remote from the position detector 110 and connected thereto via a wired or wireless connection. For example, the data processor 130 may be a computer in a cloud and connected to the position detector 110 via the internet. The process steps described herein may be embodied in hardware, in software or in a combination of hard- and software in the data processor 130.

In the exemplary illustration of FIG. 1, the apparatus 100 also comprises an optional display device 140 adapted to display an image of the pattern to the user 120. In the example of FIG. 1, an image of the pattern is projected onto the body of the user 120 using visible light projectors (indicated with dashed lines) which are included in the position detector 110a, 110b and 110c. Part of the display device 140 is a mirror positioned in front of the user. The mirror 140 may be a mirror such as usually arranged in cubicles. Thus, the user 120 is able to see the pattern resulting from the intersection of the virtual object, e.g., the sphere 141 in the example of FIG. 1, with his body, e.g., the chest in the example of FIG. 1, in real time in the mirror.

In some embodiments, the apparatus 100 comprises separate visible light projectors to project the resulting pattern on the body of the user 120. In further embodiments, the apparel display may comprise a camera and at least one screen, such as a TV or computer monitor, so that the user 120 may design the pattern for the piece of apparel at home. In still further embodiments, a virtual reality headset may be provided that would allow the user to see the digital piece of apparel on himself and/or represented on virtual screens around him. Additionally, the use of a virtual reality headset may be useful to provide the user with a visualization of the virtual objects. The user would then be able to see the virtual object and create his pattern with the knowledge of the objects. The experience of designing his piece of apparel would also be more immersive—with the user being able to see the virtual object crossing his body, creating a deeper link between the customer and the brand, even more so by combining the possibility of adding sounds or music to the user's experience.

In some embodiments, the data processor 130 may be further adapted to render the resulting pattern on an avatar.

In some embodiments, the avatar may be selected or created automatically without intervention of the user, and in other embodiments, the user may be able to select an avatar for himself. The avatar may be a pre-stored or "default" avatar, or it may also be pre-stored avatar selected from a plurality of available pre-stored avatars, based on characteristics of the user such as some body data (e.g., height, sex and weight). In some cases, the avatar of the user may be based on detailed body data of the user (e.g., obtained with a three-dimensional scan of at least a portion of the body of the user). Therefore, it is beneficial to obtain body data of the user before the pattern is created through the interaction of the user and the virtual objects in order to make the rendering of the virtual intersection between the avatar and the virtual object more realistic. In some embodiments, the body data of the user can then be used to obtain an avatar representative of the user. Obtaining an avatar based on the body data of the user can also improve the preview of the piece of apparel while creating and/or selecting the pattern, because the pattern may be represented on a virtual piece of apparel having the customized size created for the user, and be worn by an avatar the size of the user.

For example, the avatar may be created based on the body of the user 120 and may wear a digital representation (e.g., a digital model) of the piece of apparel. The position of the user in the physical space is acquired and the position of the avatar is modified in a virtual space to correspond to the position of the user in the physical space. The intersection between the avatar or the digital representation of the piece of apparel and the virtual object is then computed so as to produce said pattern data. The digital representation of the piece of apparel may also be adapted to include an image of the resulting pattern.

An image of the pattern on the digital representation of the piece of apparel may be acquired and stored in a memory (not shown in FIG. 1). The intersection between the virtual object(s) and the digital representation of the piece of apparel when worn by the avatar in the acquisition position is then determined and stored as a file (e.g., an image file). For example, a predetermined number of points of the digital representation of the piece of apparel are referenced, so that the pattern may be reproduced on a two-dimensional representation of the piece of apparel (e.g., a template). Therefore, the image stored of the pattern may be at least one two-dimensional image. Contrary to acquisition of images of the user by a camera while interacting with the virtual objects, this process has the benefit of producing a pattern corresponding to the real shape of the piece of apparel. In some cases, the fit of the piece of apparel may be very different from the fit of the corresponding item that the user is wearing when interacting with the apparatus (e.g., the selected piece of apparel being customized is a long-sleeve loose jumper but the user wears a tight t-shirt when interacting with the customization device). This technique may also be used to project the correct pattern on the user regardless of the piece of apparel he is wearing when interacting with the apparatus.

To do so, the two-dimensional image of the piece of apparel (or template) is triangulated. Each portion of the two-dimensional image is reported on the digital representation of the item worn by the avatar. When a pattern is acquired to be stored, each triangulated portion of the digital item in the virtual space is reported on the two-dimensional image with a corresponding color. In this way, a two-dimensional image of the article is obtained with a pattern corresponding to the intersection of the user and the virtual object.

The acquisition may be performed at given times, random times, moments triggered by the user 120 (e.g., with a remote control, a voice control, predefined gestures, etc.) or by another person, such as a salesman or a friend of the user 120. In some embodiments, the acquisition may be triggered using artificial intelligence techniques based on inputs, such as the attitude or expression of the user 120. The body posture of the body of the user 120 as determined by the position detectors 110a, 110b, and 110c may be acquired at a selected moment for acquisition. This body posture may then be reproduced by the digital avatar for representation to the user and determination of the pattern based on the intersection between the virtual object and the avatar or the digital representation of the piece of apparel.

In further embodiments, the piece of apparel may keep a 'memory' of the virtual objects intersected in a past predetermined duration, leading to even more diverse designs as the design would be based on the current and past positions of the user. In these embodiments, instances of intersections between the user 120 and the virtual objects may be tracked and stored so as to be accessible in the future.

In further embodiments, the apparatus 100 may also comprise a user interface adapted to display the patterns acquired and stored during the interaction between the user and the virtual objects in the customization space of a device, according to certain embodiments of the present invention.

In further embodiments, the apparatus 100 may also comprise a user interface adapted to display a menu or window for selecting a color and/or color combinations for the virtual objects 141, 142, 143a, and 143b, the pattern and/or for the piece of apparel. Such selection may be available to the user before interacting with the virtual objects in the customization space and/or after while viewing the stored pattern(s). Only certain combinations of colors may be available to the user, as predetermined by a designer, for example. It is also conceivable that the user interface may show the availability of the materials, such as yarns needed for the manufacturing of the piece of apparel. For example, if a knitting machine (not shown in FIG. 1) with a certain combination of yarns may have a long list of orders, the color combination may be unavailable on a color selection area of the user interface to the user 120 during a given duration. The duration may be calculated depending on the number of items in the order list of the knitting machine.

An apparatus according to certain embodiments of the present invention may also comprise a data processor adapted to adjust sample data with the pattern data. The sample data can serve as a starting point for the manufacture of a piece of apparel, and the data may subsequently be modified and adjusted. The sample data may provide a kind of "design blank" (which may be selected, e.g., by the user from among a number of available blanks) and be created by the original designer of the brand. The design blank may, for example, comprise data representing the external look and shape of the piece of apparel. The design blank may further comprise, for example, a provision for some technical area, such as breathable constructions in determined areas, non-customizable areas, and/or portions with more or less stretch built-in the rest of the piece of apparel, and the like.

In some embodiments, the sample data defines customizable portions of the item, and non-customizable portions of the item, and the processor may be adapted to only compute the pattern obtained by the intersection of the customizable portions of the item with the virtual object.

The design blank may subsequently be modified and adjusted to a specific customer's pattern data. Once the modification and adjustment of the sample data is complete, manufacturing data may be generated, which may be representative of machine instructions used to control a manufacturing machine to create the piece of apparel with the specification profile (size, colors, fit, pattern, etc.) as represented by the modified sample data.

Modifying the pattern data and/or the manufacturing data may, for example, enable the user to adjust or modify characteristics of the piece of apparel (e.g., a knitting pattern, the size, color, base material, and so on). According to embodiments of the present invention, the user may actively participate in the design process of the piece of apparel before its manufacture. The user may, for example, customize the pattern according to his needs and preferences, giving him a large degree of influence over the appearance of the piece of apparel.

Additionally, the adjustment or generation of a knitting manufacturing file with the pattern data may include at least the adjustment of a yarn feeding device, which is introducing the yarn to the knitting needles for each knitting loop or row to modify the yarn color or yarn type from one loop to another and/or from one row to another. That allows obtaining a built-in pattern or design that is durable and of high quality, with the possibility to adjust the color of the pattern in many different manners, and/or to adjust the yarn type in order to obtain different functional zones.

As a result, the apparatus 100 provides a device for designing a pattern for a piece of apparel in an intuitive manner and is easy to operate for an ordinary customer.

FIGS. 2A-2F are flow diagrams illustrating example processes for the manufacture a piece of apparel, according to certain embodiments of the present invention. The steps of the process 200 may be performed, for example, by a manufacturing system that interacts with a user, and that comprises an apparatus 100 for modifying the pattern data for the piece of apparel 105, as schematically presented in FIG. 1 and discussed above.

In the following, the manufacture of a piece of apparel, for example, a jumper, is described. The skilled person will recognize that any other piece of apparel may be manufactured in a similar way, and thus, the present invention is not limited to a jumper, but can be any piece of apparel.

Figure 2A:
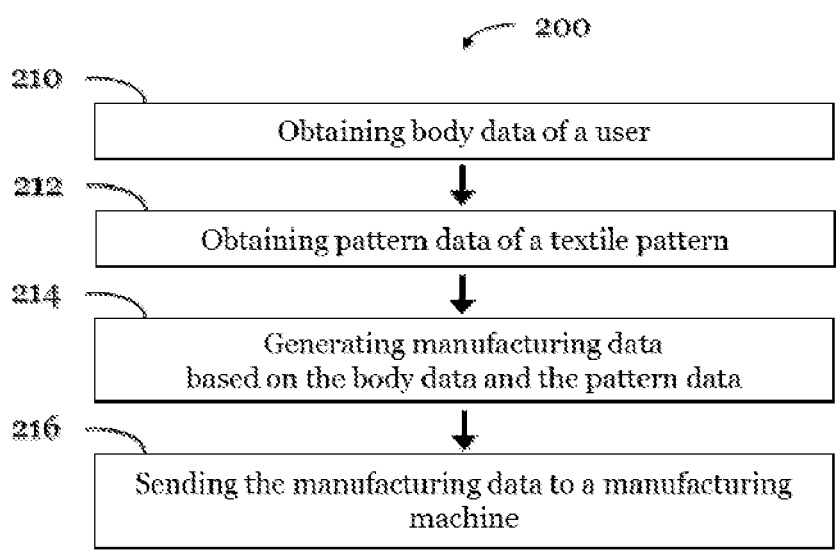
FIG. 2A-2F are flow diagrams illustrating an exemplary manufacturing process, according to certain embodiments of the present invention.

As shown in FIG. 2A, the process 200 may begin at step 210 by obtaining body data representative of at least a part of the user's body (in the figures in short "body data of a user").

Figure 2B:
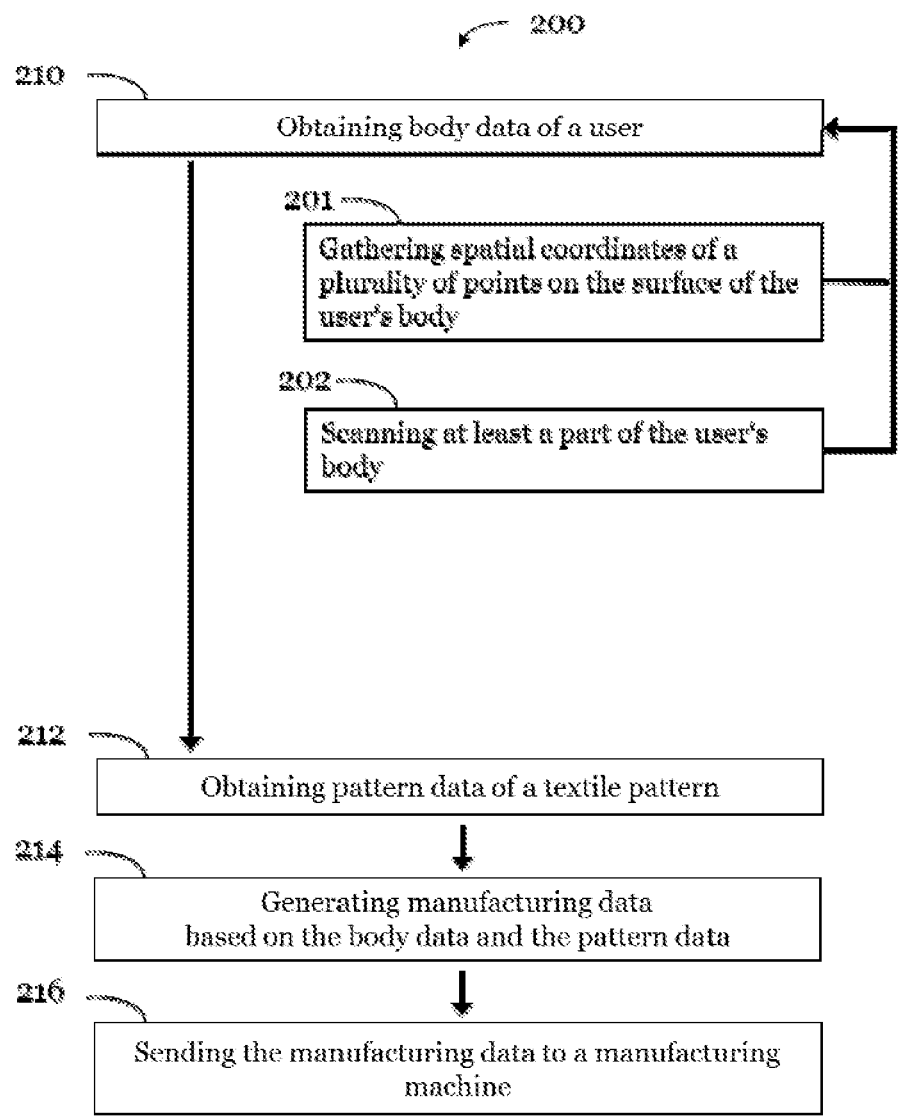

As shown in FIG. 2B, at step 210, obtaining body data representative of at least a part of the user's body may be performed using step 202 by taking (two- or three-dimensional) scans of the body or part of the body, for example, from the front or the back, or step 201, by gathering spatial coordinates of a plurality of points on the surface of the user's body (in other words, a discrete scan), and thus, to obtain body data and/or body parameters, such as a point cloud. Moreover, data may be extracted from this point cloud in order to provide predetermined measurements for the piece of apparel, such as for a jumper. Examples of predetermined measurements for the piece of apparel can include a width and/or perimeter defined at: a shoulder, a breast, a waist, a wrist, an upper arm, a head, an arm, a torso length, a diameter at a leg, a foot length, an instep size, and so on. In some embodiments, a body parameter for each arm or leg may be measured taking into account differences of length and/or perimeter. Moreover, the arm or leg length may be divided in two body parameters to obtain the correct measurements from shoulder to elbow and from elbow to wrist (respectively hip to knee and knee to ankle). In some embodiments, at least one two-dimensional photograph or video may be used to determine the body data. Many apparatuses may be used to obtain the body data, such as at least one of the following instruments: body scanner, camera, doppler-based sensor, such as a radar, etc. and such instruments may be based on visible light, infrared light, etc. In some embodiments, the body data may also be retrieved from a database. Moreover, the step 210 may be controlled by a central computer unit (not shown in FIG. 2) and/or may be set up and supervised by at least one human.

Returning to FIG. 2A, the process 200 may continue with step 212 by obtaining pattern data of a pattern, such as a textile pattern. In some embodiments, other materials, such as plastic materials, may be used for the pattern. Step 212 may be performed as described above with respect to FIG. 1.

Figure 2C:
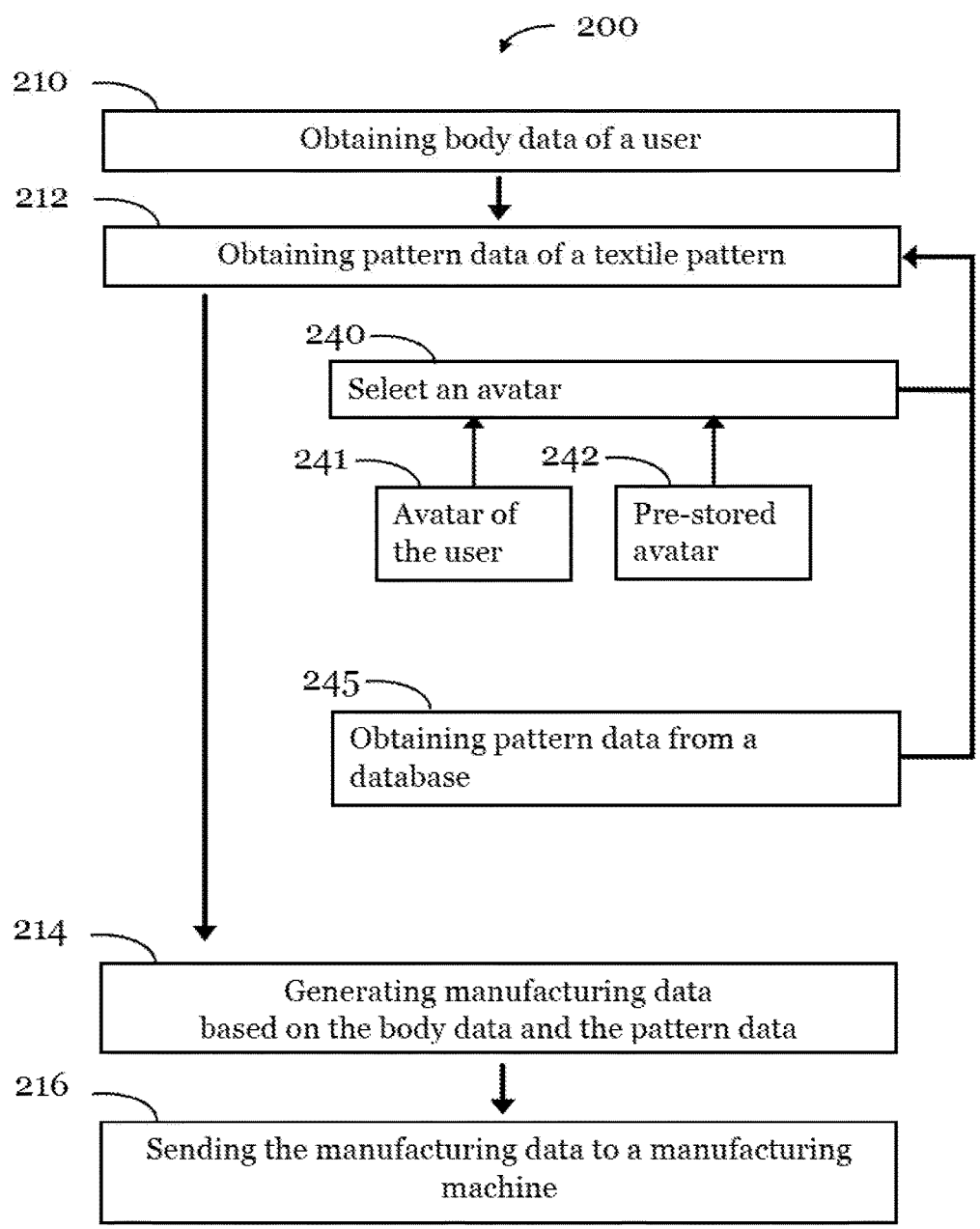

As shown in FIG. 2C and as described in more detail with respect to FIG. 1, obtaining pattern data at step 212 may be facilitated by the use of an avatar of the user. The avatar may be used to provide a preview about the effect any change in the pattern data initiated by the user may have on the look of the piece of apparel when completed. In other words, an avatar as described above may be used in a user customization of the pattern data. In some embodiments, the pattern data may also be obtained from a database, as in step 245, which database may, for example, store pre-defined patterns, which may be classified according to the type of apparel currently being constructed.

At step 240, the avatar may be selected or created automatically without intervention of the user, or the user may be able to select an avatar. The avatar may be an avatar of the user as in step 241, for example, based the body data of the user, or may be a pre-stored or "default" avatar as in step 242, or it may also be pre-stored avatar selected within a plurality of available pre-stored avatars, based on some characteristics of the user, such as some body data. Therefore, although step 212 may be performed before step 210 in some embodiments, it may be beneficial to perform step 212 after step 210 as shown on FIG. 2A. Indeed, the body data of the user can then be used to obtain an avatar representative of the user. Using an avatar based on the body data of the user can also improve the preview of the piece of apparel while creating and/or selecting the pattern. The pattern may be represented on a virtual piece of apparel having the customized size created for the user, and may be presented as being worn by an avatar the size of the user. The benefits of such processes have also been described above in relation to FIG. 1.

Figure 2D:
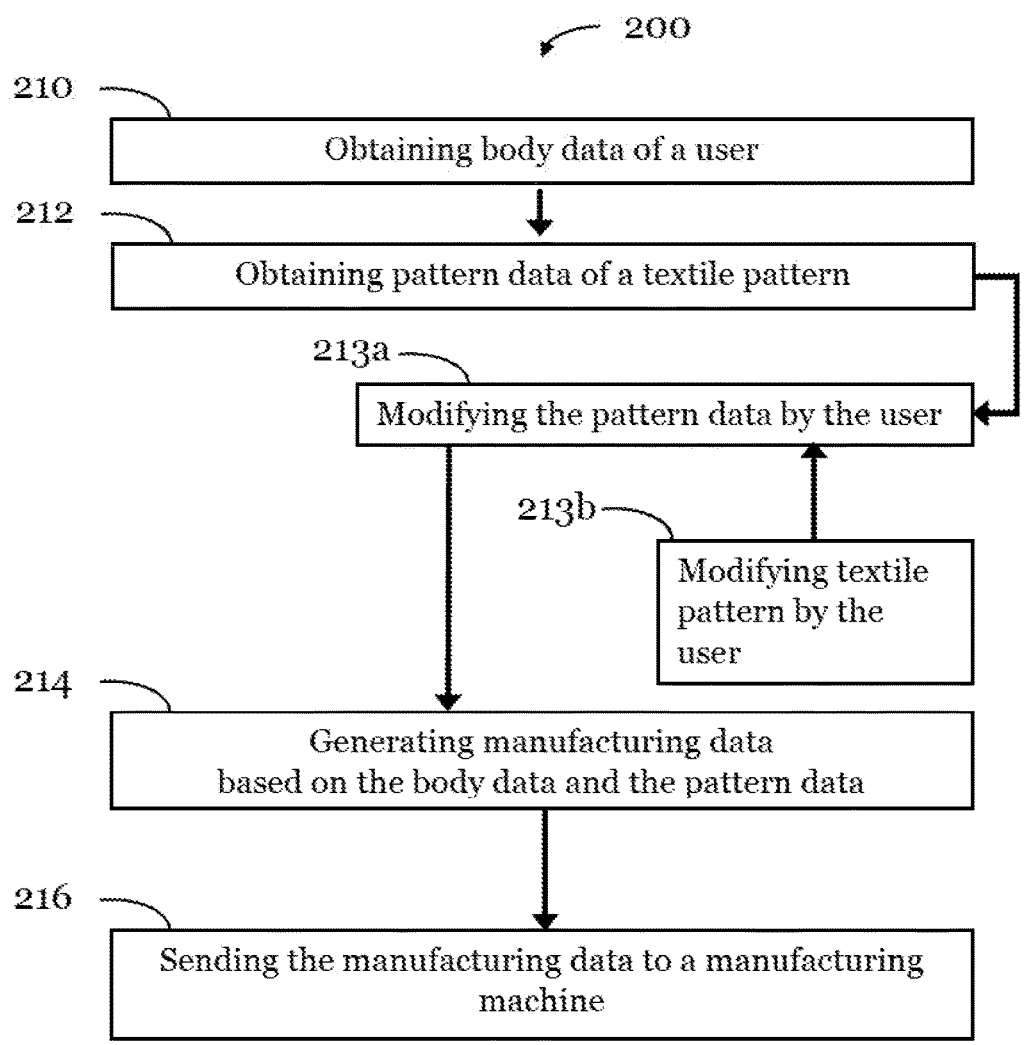

As shown in FIG. 2D, the user may be able to change his mind and modify the pattern data, as in step 213a, to further customize the piece of apparel. This step comprises both the option that the user directly modifies the pattern data itself, or he may use or interact with an interaction unit that effects the change in the pattern data and may be controlled or used in a more intuitive manner than working on the data level itself as described in FIG. 1. As mentioned above, the user may also further modify the textile pattern, as in step 213b, which leads to a modification of the pattern data at step 213a. To do this, for example, the apparatus 100 discussed in relation to FIG. 1 may be employed. Ultimately, the change in the pattern data will lead to a corresponding change in the manufacturing data, as the skilled person will understand. Nonetheless, both options are listed here separately since modifying the manufacturing data directly may have a more direct impact on the construction of the piece of apparel, while a modification of the pattern data may be a change that only indirectly influences the manufacturing data. For example, in certain embodiments, the user may be restricted to modifying the pattern data only and the corresponding alteration of the manufacturing data will be derived automatically, for safety reasons or to avoid erroneous modifications in the manufacturing data, as well as for ease of use and accessibility of the process to the final customer.

Figure 2E:
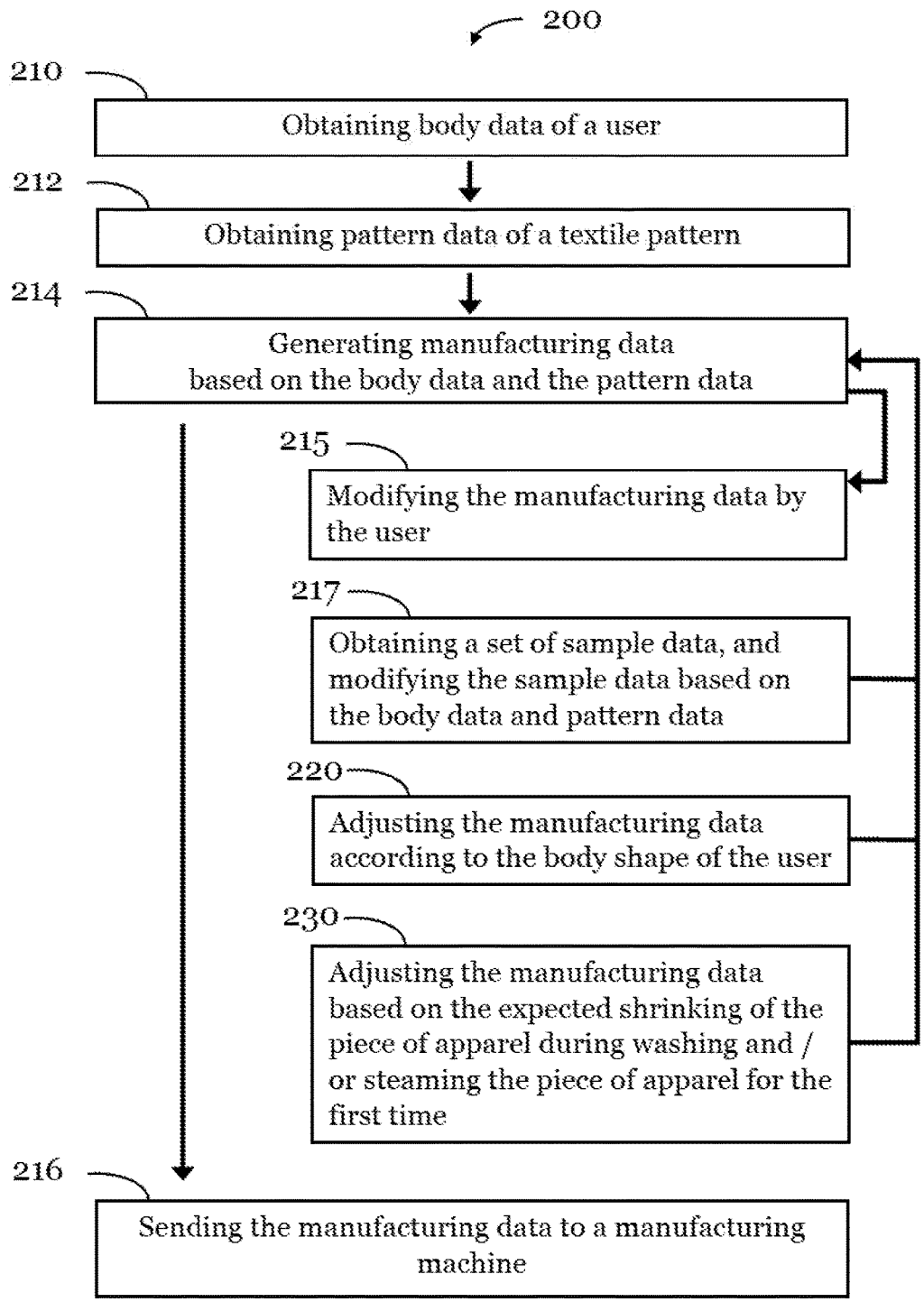
Figure 2F:
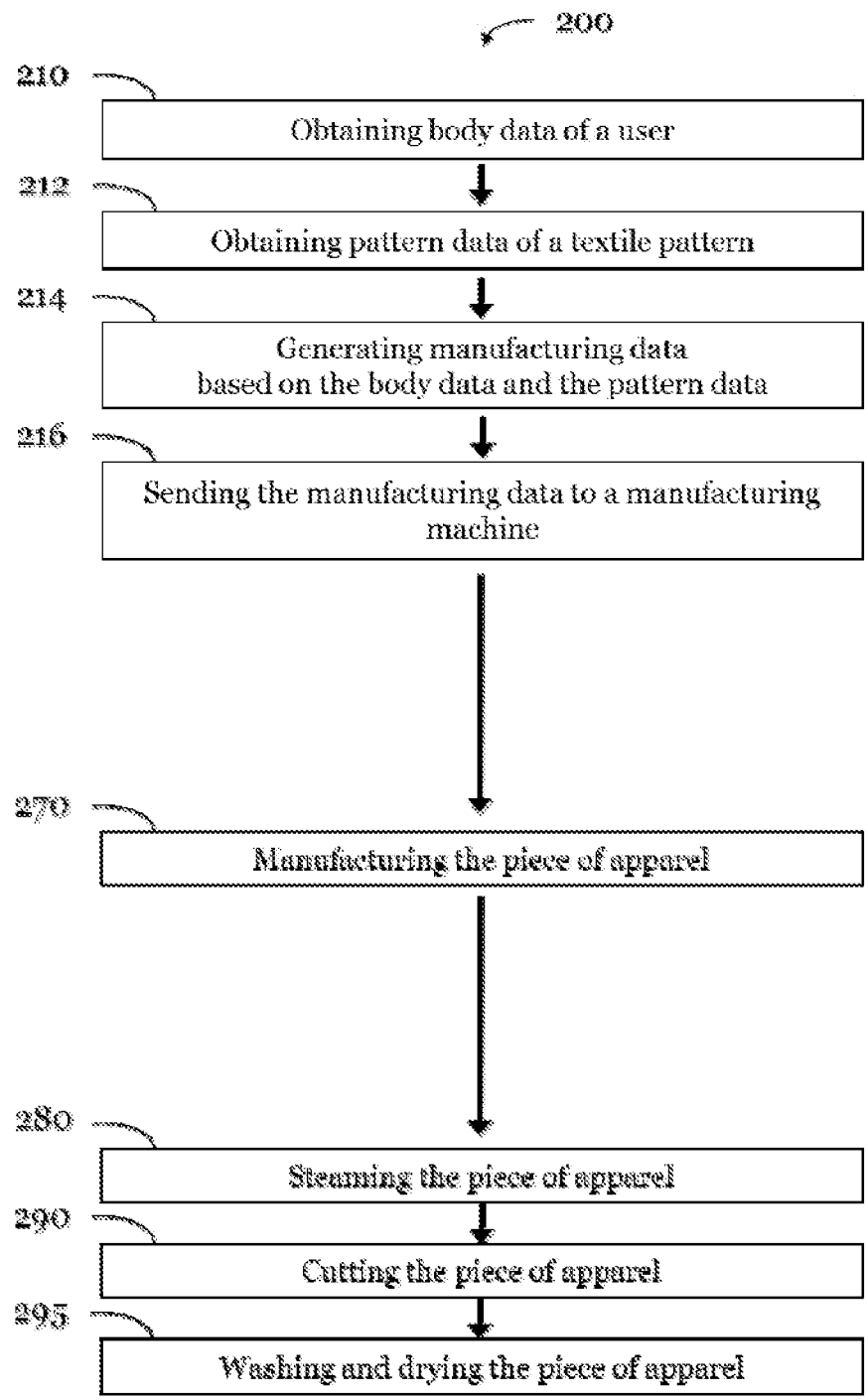

After obtaining the body data in step 210 and obtaining the pattern data in step 212, manufacturing data is generated at step 214 using the body and pattern data. FIG. 2E shows further optional steps 215, 217, 220, and 230 that each may be performed during the generation of the manufacturing data. Each of the steps 215, 217, 220, and 230 may also be combined with one another, or selectively performed. For example, in a step 215, the manufacturing data may be modified by the user. This may have a more direct impact on the construction of the piece of apparel than a modification of the pattern data as mentioned in step 213*a* which may be a change that only indirectly influences the manufacturing data. For example, in certain embodiments, the user may be restricted to modifying the pattern data only and the corresponding alteration of the manufacturing data will be derived automatically, for safety reasons or to avoid erroneous modifications in the manufacturing data, as well as for ease of use and accessibility of the process to the final customer.

At a step 217, a set of sample data representative of the above mentioned "design blank" may be obtained (e.g., retrieved from a database of designs) and the sample data may be modified based on the specific set of body data and pattern data of the user. The sample data retrieved in step 217 may be selected by the user through an interface in a database of many different sets of sample data, each representing a product type, for example. The user may thus be able to select which kind of article (e.g., a shoe, a jumper, a shirt, etc.) he would like to customize and have produced, and/or to select which model of article within the selected or available kind of article he would like to have. Therefore, step 217 may also, in some embodiments, be performed before step 210, so that body data and/or pattern data may be acquired for the specific kind of article and/or model of article selected.

Moreover, the manufacturing data may be adjusted according to the body shape of the user, as in step 220. Additionally, the manufacturing data may be adjusted in step 230 based on the expected shrinking of the piece of apparel during the first washing, steaming, and/or drying of the piece of apparel.

In any case, once the manufacturing data is generated at step 214, the manufacturing data is transmitted to the manufacturing machine, at step 216.

Using this manufacturing data, a manufacturing machine (e.g., a knitting machine) can then manufacture the piece of apparel, as in step 270. For example, the knitting machine may have two needle beds. Thus, the front and the back of the apparel may be knitted in parallel on the two needle beds and may be joined together with loops between front and back bed at ends of rows. In some embodiments, the front of the apparel may be knitted on odd needles of one needle and the back on even needles of the same needle bed.

In some embodiments, process 200 may include at least one post-processing step. For example, at step 280, the apparel may be steamed by a steaming unit so that internal tensions and/or twists of the yarns may be removed after manufacturing, such as knitting. The steaming step may set the shape of the apparel.

At step 290, extra portions of the apparel (e.g., starter rows of carrier yarn to hold the front and the back together) may be trimmed away by a cutting unit and/or by a person.

At the step 295, the apparel may be washed and dried by a washing and drying unit in order to provoke the shrinkage that typically occurs during the first cycle of washing and/or drying, as mentioned above and/or to remove foreign bodies that attached to the apparel during the manufacturing process (e.g., residuals of the knitting oil). In some embodiments, the apparel may be fluffed up by such step to improve the hand feel and/or haptic aspects of the apparel in order to immediately provide the apparel for the user.

As a result, the process 200 provides for the manufacture of a piece of apparel customized to the size of a customer and in which a user has the opportunity to participate to the design of the piece of apparel through interaction of a user.

A further aspect of the present invention is given by a system for performing embodiments of the process 200. Moreover, the system may comprise at least one processor, such as a microprocessor.

Figure 3A:
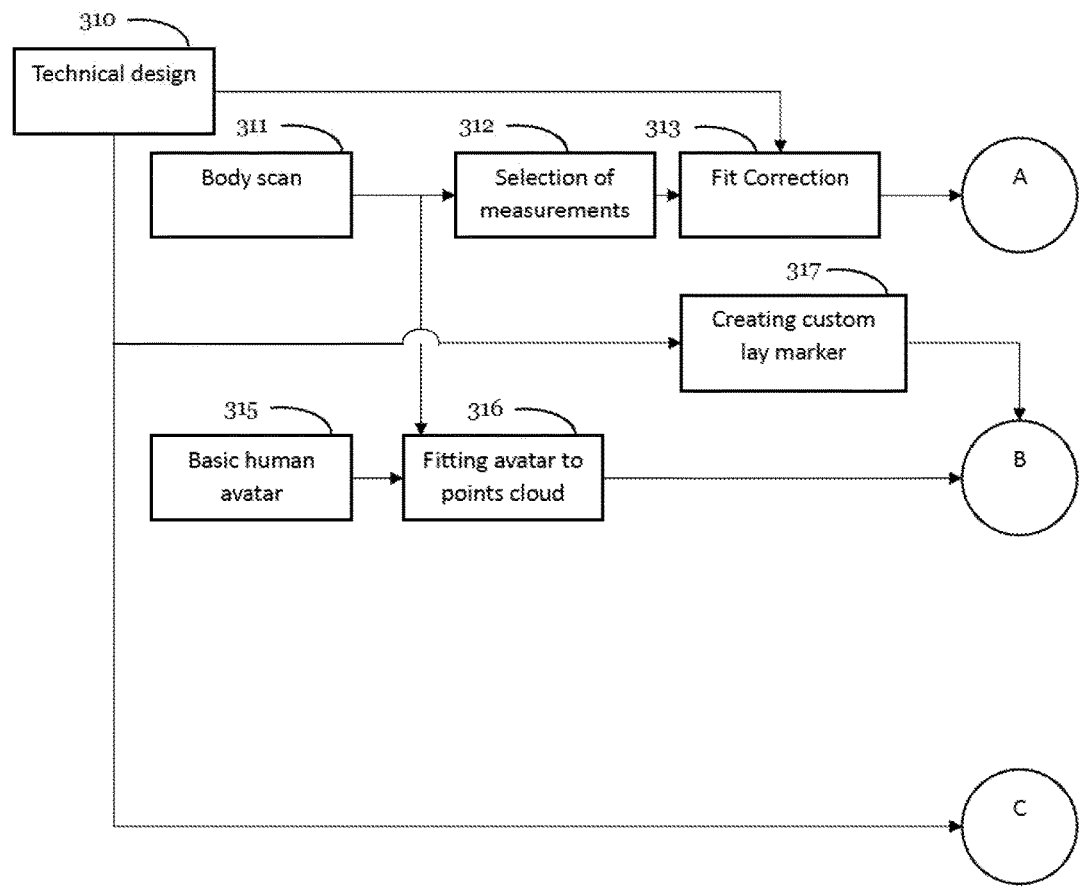
FIG. 3A-3B are flow diagrams illustrating a process for manufacturing a piece of apparel, according to certain embodiments of the present invention.
Figure 3B:
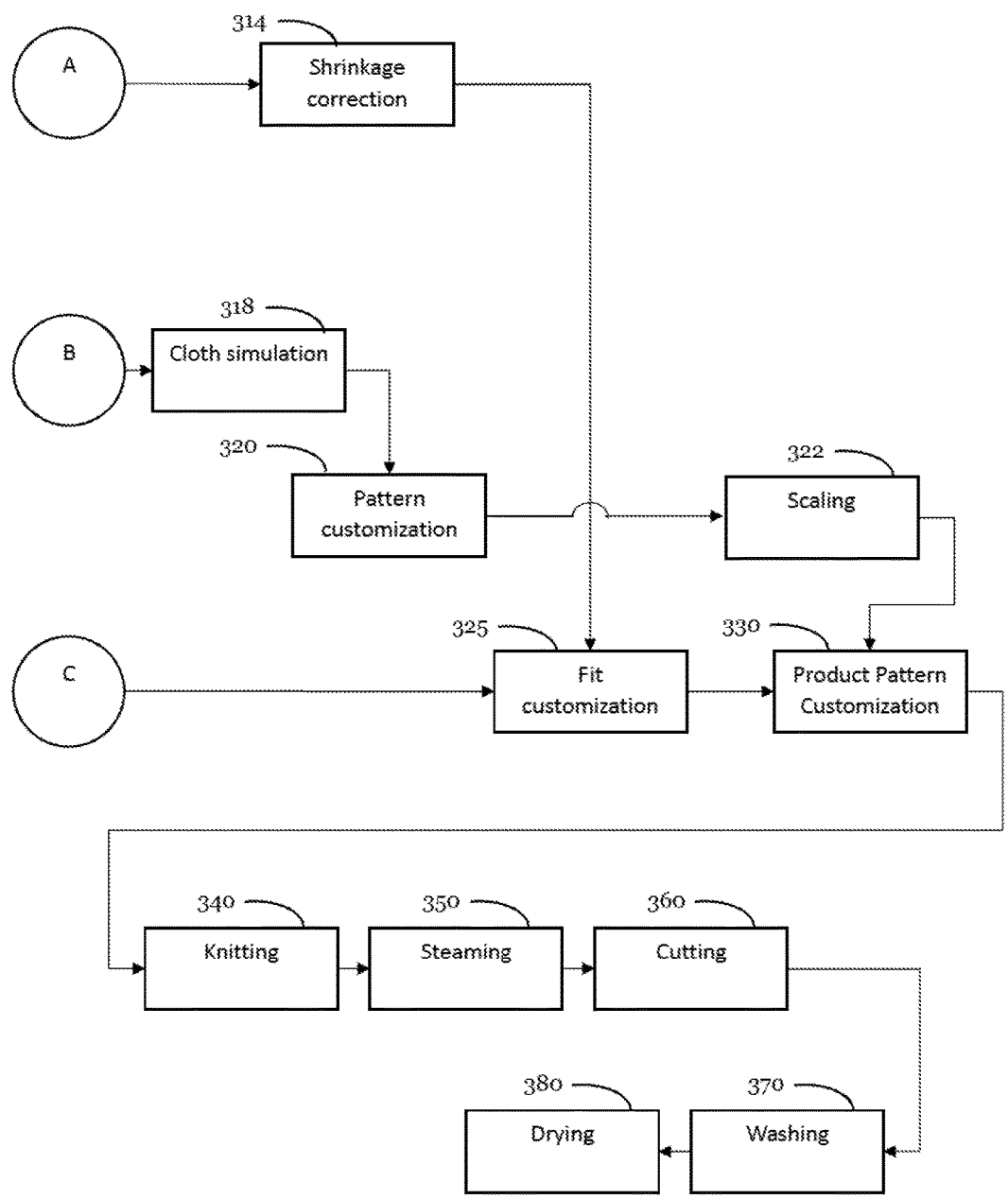

FIG. 3A and FIG. 3B are flow diagrams illustrating exemplary embodiments of the process 300 for the manufacture a piece of apparel, for example, a jumper. The process 300 may comprise at least one step of the process 200 described above as will be recognized by the skilled person.

As shown in FIG. 3A, at step 310, a technical design is provided by a designer and may comprise at least one digital file, such as a basic knitting file. For example, the digital file may be executable on a computing device. For example, the digital file may comprise sample data in the form of instructions for a manufacturing machine, such as a knitting machine.

At steps 311 and 312, body data may be acquired by a 3D scan of a user's body. Step 311 provides the possibility that a 3D scan of the person may create a point cloud of the surface of the user's body. Moreover, in step 312, a selection of measurements from the point cloud may provide a set of values corresponding to the body data. The point cloud and/or the set of values corresponding to the body data may be used to obtain the pattern data as described in detail with respect to FIG. 1.

At step 313, the set of values may be adjusted to take into account the style of the product, such as its fit (e.g., compression fit or casual fit). Different techniques may be used to correct the set of values. For example, there may be a fixed correction value, and/or there may be a percentage of the measured value for correcting. The techniques may also be adapted depending on the nature of the value. For example, a fixed correction value for a shoulder width, another fixed correction value for the waist perimeter, a percentage for breast perimeter and a correction value for each range of values of the arms' length. This information may be comprised in the technical design obtained from the brand's designer.

At step 314 in FIG. 3B, the set of values may be then adjusted to take into account the shrinkage of the piece of apparel when being steamed and/or washed for a first time. Here, the same choice of techniques as mentioned above in step 313 may be used in order to get a final set of values.

Referring again to FIG. 3A, at step 315, a digital basic avatar (e.g., a default avatar) may be selected from a database of predetermined avatars. At step 316, the basic avatar selected in step 315 may be adjusted according to the acquired body parameters of step 311. In some embodiments, the avatar may be directly created from the point cloud of the surface of the user. In more detail, the surface of the avatar may be optimized to improve the matching of the surface of the avatar to the point cloud and/or to improve the matching of the joints of the avatar to the joints of the user. The surface of the avatar may be used to obtain the pattern data as described in detail with respect to FIG. 1.

At step 317, a modified lay marker (or "template") of the piece of apparel may be created based on the technical design and the corrected set of values of step 313. The lay marker is a 2D and/or 3D representation of the piece of apparel. In some embodiments, the lay marker may be any other data representing the piece of apparel to be customized.

As shown in FIG. 3B, at step 318, a digital representation of the piece of apparel may be created based on the custom lay marker obtained at step 317, which takes into account the corrected values of step 313 due to the custom lay marker.

To do so, the lay marker (or template) is triangulated. Each portion of the lay marker is reported on the digital representation of the item worn by the avatar.

At the next step 320, a pattern design may be obtained through an interaction between the user and a pattern designing system, such as an apparatus 100 as described in relation to FIG. 1. Thus, the output may be a digital file (e.g., a custom lay marker) comprising at least data corresponding to the patterns and/or colors of the article at least in the modifiable areas of the piece of apparel. Moreover, at least one image in 2D and/or 3D of the piece of apparel with the designed pattern and colors may be provided in a file, such as a custom lay marker. In some embodiments, the file may comprise only images of the pattern and colors without an image of or data representing the piece of apparel.

At step 322, at least one image of the piece of apparel may be scaled at a predefined size. This ensures that the pattern fits the actual size of the piece of apparel to be manufactured. For example, the scaling factor for a user wearing "S" will be smaller than with a user wearing "XXL". Such step is mainly useful when the output of step 320 is a sole image with a colored pattern.

At step 325, the final set of values of step 314 may be used to modify the basic knitting file into a customized knitting file. For example, rows of knitting and/or loops may be added or deleted depending on the corrected set of values (e.g., resulting from steps 311 to 314). Different strategies of adjustment may be used, however, for example, the adjustment may be made according to a value found in a predefined memorized matrix, depending at least on the values obtained in step 312. Such matrix may code for different sizes and/or combinations of sizes (e.g., medium with long sleeves, or large with wide sleeves, etc.), based on the measurements obtained after the body scan, in step 312.

Additionally, the basic knitting file may be modified so as to provide transitioning between each point of measurement (e.g., shoulders to breast) to which each value corresponds. Such a digital knitting file may be used to produce a fit-customized piece of apparel. As the design customization is integrated in the knitting file, the design may be actually knitted leading to a high quality long-lasting design compared for example to screen-printing.

At step 330, the customized knitting file and the scaled at least one image may be used to generate instructions relating to yarn number and/or color to be stitched in each loop, the number of loops on each row, the number of rows, the stich types, weft/warp ratio, etc. For example, a weft/warp ratio may be applied. In this way, the difference of size of the loops in the two directions may be taken into account, in particular, when integrating the pattern data to preserve the aspect of the pattern selected by the user. In some embodiments, such weft/warp ratio may be comprised in the design blank, may be applied at step 314 on the fit data, and may be applied at step 322 on the pattern data. In some embodiments, at least one of these instructions may be included into the set of values in step 313 and/or step 314.

At steps 340 to 380, the piece of apparel may be knitted based on the finalized knitting file, steamed, cut, washed and finally dried as mentioned above.

As a result, the process 300 also provides for the manufacture of a piece of apparel customized to the size of a customer and in which a user has the opportunity to participate in the design of the piece of apparel through interaction.

In the following, further examples are described to facilitate the understanding of embodiments of the present invention:

1. Method (200) for the manufacture of a piece of apparel, comprising the steps of:
   a. obtaining (210) body data representative of at least one dimension of at least a part of a user's body;
   b. obtaining (212) pattern data representative of at least one pattern to be applied to the piece of apparel to be manufactured;
   c. generating (214), based on the body data and the pattern data, manufacturing data adapted to be processed by a manufacturing machine; and
   d. sending (216) the manufacturing data to a manufacturing machine for processing and for manufacturing at least a part of the piece of apparel.

2. Method (200) according to the preceding example, wherein the step (214) of generating the manufacturing data comprises the steps of obtaining (217) a set of sample data and modifying the sample data based on the body data and the pattern data to obtain the manufacturing data.

3. Method (200) according to one of the preceding examples, wherein the step of obtaining (210) the body data comprises the step (201) of gathering spatial coordinates of a plurality of points on the surface of the user's body.

4. Method (200) according to one of the preceding examples, wherein the step of obtaining (210) body data comprises scanning (202) at least a part of the user's body.

5. Method (200) according to one of the preceding examples, wherein the body data comprises body parameters which at least partly define the body shape of the user.

6. Method (200) according to the preceding examples, wherein the step of generating (214) the manufacturing data comprises adjusting (220) the manufacturing data according to the body shape of the user.

7. Method (200) according to one of the preceding examples, wherein the step of generating (214) the manufacturing data comprises adjusting (230) the manufacturing data based on the expected shrinking of the piece of apparel during the first washing and/or steaming of the piece of apparel.

8. Method (200) according to one of the preceding examples, wherein the step of obtaining (212) the pattern data comprises selecting (240) an avatar for the user.

9. Method (200) according to the preceding examples, wherein the avatar is an avatar of the user based on the body data of the user.

10. Method (200) according to one of examples 8 or 9, wherein the avatar is a pre-stored avatar.

11. Method (200) according to one of the preceding examples, wherein the step of obtaining (212) the pattern data comprises obtaining (245) the pattern data from a database.

12. Method (200) according to one of the preceding examples, further comprising the step of modifying (213a; 215) the pattern data and/or manufacturing data by the user.

13. Method (200) according to the preceding examples, wherein the step of modifying (213a) the pattern data comprises modifying (213b) the at least one pattern of the piece of apparel by the user.

14. Method (200) according to one of the preceding examples, further comprising the step of manufacturing (270) the piece of apparel based on the manufacturing data.

15. Method (200) according to one of the preceding examples, wherein the manufacturing data includes instructions for a manufacturing machine.

16. Method (200) according to the preceding examples, further comprising controlling the manufacturing machine based on the manufacturing data.

17. Method (200) according to one of the preceding examples, further comprising the step of steaming (280) the manufactured piece of apparel.

18. Method (200) according to one of the preceding examples, further comprising the step of cutting (290) the manufactured piece of apparel.

19. Method (200) according to one of the preceding examples, further comprising the steps of washing and/or drying (295) the manufactured piece of apparel.

20. Method (200) according to one of the preceding examples, wherein the manufacturing machine is a knitting machine.

21. System for the manufacture of a piece of apparel, in particular a knitted piece of apparel, comprising:
   e. means for obtaining (210) body data representative of at least one dimension of at least a part of the user's body;
   f. means for obtaining (212) pattern data representative of at least one pattern to be applied to the piece of apparel to be manufactured;
   g. means for generating (214) based on the body data and the pattern data manufacturing data adapted to be processed by a manufacturing machine; and
   h. means for sending (216) the manufacturing data to a manufacturing machine for processing and for manufacturing at least a part of the piece of apparel.

22. System according to the preceding example, wherein the means for obtaining (210) body data is a body scan unit adapted to gather (201) spatial coordinates of a plurality of points on the surface of the user's body.

23. System according to any one of examples 21 or 22, wherein the means for obtaining (210) body data is further adapted to determine a plurality of body parameters which at least partly define the body shape of the user.

24. System according to any one of examples 21-23, further comprising a fit correction unit adapted to adjust (220) the manufacturing data according to the body shape of the user.

25. System according to any one of examples 21-24, further comprising a shrink correction unit adapted to adjust (230) the manufacturing data based on the expected shrinking of the piece of apparel during washing and/or steaming the piece of apparel for the first time.

26. System according to any one of examples 21-25, further comprising a database storing avatar data.

27. System according to the preceding example, wherein the avatar is an avatar of the user based on the body data of the user.

28. System according to any one of examples 26 or 27, wherein the avatar is a pre-stored avatar.

29. System according to any one of examples 21-28, further comprising an apparatus (100) for allowing the user to modify (213*a*; 215) the pattern data and/or manufacturing data prior to manufacture.

30. System according to any one of examples 21-29, further comprising a manufacturing machine adapted to manufacture (270) the piece of apparel based on the manufacturing data.

31. System according to any one of examples 21-30, wherein the manufacturing data includes instructions for the manufacturing machine.

32. System according to any one of examples 30 or 31, wherein the manufacturing machine is a knitting machine.

33. System according to any one of the examples 30-32, further comprising a control unit adapted to control the manufacturing machine based on the manufacturing data.

34. System according to any one of examples 21-33, further comprising a steaming unit adapted to steam (280) the manufactured piece of apparel.

35. System according to any one of examples 21-34, further comprising a cutting unit adapted to cut (290) the manufactured piece of apparel.

36. System according to any one of examples 21-35, further comprising a washing unit and/or a drying unit adapted to wash and/or dry (295) the manufactured piece of apparel.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. A computer-implemented method for manufacturing apparel, the method comprising:
   obtaining body data representing at least one dimension of at least a part of a user's body, the body data being used to generate an avatar of the user's body in a virtual space;
   obtaining pattern data representing at least one pattern to be applied to a piece of apparel, the at least one pattern being selected based on an intersection between the avatar and a virtual object in the virtual space;
   generating, based on the body data and the pattern data, manufacturing data adapted to be processed by a manufacturing machine; and
   transmitting the manufacturing data to the manufacturing machine, wherein when the manufacturing data is received at the manufacturing machine, the manufacturing data is processed and at least part of the piece of apparel is manufactured with the at least one pattern.

2. The computer-implemented method of claim 1, wherein the generating the manufacturing data further comprises:
   obtaining a set of sample data; and
   modifying the sample data based on the body data and the pattern data to obtain the manufacturing data.

3. The computer-implemented method of claim 1, wherein the obtaining the body data comprises detecting at least one spatial coordinate of a plurality of points on a surface of the user's body.

4. The computer-implemented method of claim 1, wherein the obtaining the body data comprises scanning at least a part of the user's body.

5. The computer-implemented method of claim 1, wherein the body data comprises at least one body parameter that at least partly defines a body shape of the user's body.

6. The computer-implemented method of claim 5, wherein the generating the manufacturing data comprises adjusting the manufacturing data according to the body shape of the user.

7. The computer-implemented method of claim 1, wherein the generating the manufacturing data comprises adjusting the manufacturing data based on an expected shrinking of the piece of apparel during a first washing or a first steaming of the piece of apparel.

8. The computer-implemented method of claim 1, wherein the obtaining the pattern data comprises selecting an avatar for the user.

9. The computer-implemented method of claim 1, further comprising:
modifying the pattern data, wherein modifying the pattern data includes modifying at least one pattern of the piece of apparel.

10. The computer-implemented method of claim 1, further comprising:
manufacturing the piece of apparel based on the manufacturing data.

11. A system for manufacturing apparel, the system comprising:
one or more data processors; and
a non-transitory computer-readable storage medium containing instructions which, when executed on the one or more data processors, cause the one or more data processors to perform operations including:
obtaining body data representing at least one dimension of at least a part of a user's body, the body data being used to generate an avatar of the user's body in a virtual space;
obtaining pattern data representing at least one pattern to be applied to a piece of apparel, the at least one pattern being selected based on an intersection between the avatar and a virtual object in the virtual space;
generating, based on the body data and the pattern data, manufacturing data adapted to be processed by a manufacturing machine; and
transmitting the manufacturing data to the manufacturing machine, wherein when the manufacturing data is received at the manufacturing machine, the manufacturing data is processed and at least part of the piece of apparel is manufactured with the at least one pattern.

12. The system of claim 11, wherein the body data is obtained by detecting at least one spatial coordinate of a plurality of points on a surface of the user's body.

13. The system of claim 11, wherein the obtaining the body data further includes determining at least one body parameter, wherein a body parameter is at least partly defined by a body shape of the user.

14. The system of claim 11, wherein the operations further comprise:
adjusting the manufacturing data according to a body shape of the user.

15. The system of claim 11, wherein the operations further comprise:
adjusting the manufacturing data based on an expected shrinking of the piece of apparel during washing or steaming of the piece of apparel for a first time.

16. The system of claim 11, wherein an avatar of the user is based on the body data of the user.

17. The system of claim 11, further comprising:
a manufacturing machine adapted to manufacture the piece of apparel based on the manufacturing data.

18. The system of claim 11, wherein the manufacturing data includes instructions for controlling the manufacturing machine.

19. The system of claim 18, wherein the manufacturing machine is a knitting machine.

20. The system of claim 11, further comprising a cutting unit adapted to cut the manufactured piece of apparel.

21. A system for generating customized patterns, the system comprising:
at least one position detector configured to generate body data, wherein the body data represents a shape of a user's body;
a data processor configured to:
generate a virtual space including at least one virtual object and an avatar, wherein a shape of the avatar is defined using the body data,
detect at least one intersection between the avatar and the at least one virtual object in the virtual space, and
generate customized pattern data based on the at least one intersection, wherein the at least one intersection between the avatar and the at least one virtual object causes a pattern design to be formed on the avatar, and wherein the pattern design is used to generate the customized pattern data; and
a manufacturing machine configured to manufacture a wearable item using the customized pattern data and the body data, the pattern design being applied to the wearable item.

22. The system for generating customized patterns of claim 21, wherein the pattern design is formed on the avatar based on the shape of the user's body.

23. The system for generating customized patterns of claim 21, wherein the data processor is further configured to:
modify the pattern design in real-time, wherein modifying the pattern design includes detecting a new intersection between the avatar and the at least one virtual object, wherein the new intersection causes a new pattern to be formed on the avatar, and wherein the pattern design is modified using the new pattern.

24. The system for generating customized patterns of claim 21, further comprising:
a display device configured to display the avatar and the at least one virtual object.

25. The system for generating customized patterns of claim 21, wherein the avatar is controlled by movement of the user.

* * * * *